US008997718B2

(12) United States Patent
McAlister

(10) Patent No.: US 8,997,718 B2
(45) Date of Patent: *Apr. 7, 2015

(54) FUEL INJECTOR ACTUATOR ASSEMBLIES AND ASSOCIATED METHODS OF USE AND MANUFACTURE

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/316,412

(22) Filed: Dec. 9, 2011

(65) Prior Publication Data

US 2012/0145125 A1     Jun. 14, 2012

Related U.S. Application Data

(60) Continuation of application No. 12/804,510, filed on Jul. 21, 2010, now Pat. No. 8,074,625, which is a continuation-in-part of application No. 12/581,825, filed on Oct. 19, 2009, now Pat. No. 8,297,254, which (Continued)

(51) Int. Cl.
*F02M 51/00*     (2006.01)
*F02M 57/06*     (2006.01)
(Continued)

(52) U.S. Cl.
CPC ........... *F02M 51/0671* (2013.01); *F02M 57/06* (2013.01); *F02M 21/0269* (2013.01);
(Continued)

(58) Field of Classification Search
USPC ......... 123/490, 499, 498, 467, 468, 469, 470, 123/472, 480; 239/585.1–585.5, 102.2, 239/533.2, 533.9; 251/129.15
See application file for complete search history.

(56) References Cited

U.S. PATENT DOCUMENTS

| 802,946 A | 10/1905 | Waterman et al. |
| 1,451,384 A | 4/1923 | Whyte |

(Continued)

FOREIGN PATENT DOCUMENTS

| DE | 3443022 A1 | 5/1986 |
| DE | 102005060139 | 6/2007 |

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

(Continued)

*Primary Examiner* — Mahmoud Gimie
(74) *Attorney, Agent, or Firm* — Loeb & Loeb LLP

(57) ABSTRACT

The present disclosure is directed to integrated injector/igniters providing efficient injection, ignition, and complete combustion of various types of fuels. One such injector/igniter can include a body having a base portion opposite a nozzle portion. The base portion receives fuel into the body and the nozzle portion can be positioned adjacent the combustion chamber. The injector further includes a valve carried by the nozzle portion that is movable between a closed position and an open position to inject the fuel into the combustion chamber. An actuator is coupled to the valve and extends longitudinally through the body towards the base portion, and a driver is carried by the body and is movable between a first position and a second position. In the first position the driver does not move the actuator and in the second position the driver moves the actuator to move the valve to the open position.

22 Claims, 11 Drawing Sheets

Related U.S. Application Data is a division of application No. 12/006,774, filed on Jan. 7, 2008, now Pat. No. 7,628,137, said application No. 12/804,510 is a continuation-in-part of application No. 12/653,085, filed on Dec. 7, 2009, now Pat. No. 8,635,985, which is a continuation-in-part of application No. 12/006,774, said application No. 12/804,510 is a continuation-in-part of application No. PCT/US2009/067044, filed on Dec. 7, 2009.

(60) Provisional application No. 61/237,479, filed on Aug. 27, 2009, provisional application No. 61/237,466, filed on Aug. 27, 2009, provisional application No. 61/237,425, filed on Aug. 27, 2009, provisional application No. 61/304,403, filed on Feb. 13, 2010, provisional application No. 61/312,100, filed on Mar. 9, 2010.

(51) Int. Cl.
*F02M 21/02* (2006.01)
*F02M 51/06* (2006.01)
*F02B 75/12* (2006.01)
*H01M 8/04* (2006.01)

(52) U.S. Cl.
CPC ....... *F02M21/0266* (2013.01); *F02M 21/0275* (2013.01); *F02M 21/0254* (2013.01); *F02B 2075/125* (2013.01); *H01M 8/04089* (2013.01); *H01M 8/04186* (2013.01); *Y02T 10/123* (2013.01); *Y02T 10/32* (2013.01)

(56) References Cited

U.S. PATENT DOCUMENTS

| | | |
|---|---|---|
| 1,765,237 A | 7/1938 | King |
| 2,255,203 A | 9/1941 | Wiegand |
| 2,441,277 A | 5/1948 | Lamphere |
| 2,721,100 A | 10/1955 | Bodine, Jr. |
| 3,058,453 A | 10/1962 | May |
| 3,060,912 A | 10/1962 | May |
| 3,081,758 A | 3/1963 | May |
| 3,243,335 A | 3/1966 | Faile |
| 3,286,164 A | 11/1966 | De Huff |
| 3,373,724 A | 3/1968 | Papst |
| 3,391,680 A | 7/1968 | Benson |
| 3,520,961 A | 7/1970 | Suda et al. |
| 3,594,877 A | 7/1971 | Suda et al. |
| 3,608,050 A | 9/1971 | Carman et al. |
| 3,614,486 A | 10/1971 | Smiley |
| 3,689,293 A | 9/1972 | Beall |
| 3,875,612 A | 4/1975 | Poitras |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,020,803 A | 5/1977 | Thuren et al. |
| 4,066,046 A | 1/1978 | McAlister |
| 4,095,580 A | 6/1978 | Murray et al. |
| 4,101,076 A | 7/1978 | Bart |
| 4,105,004 A | 8/1978 | Asai et al. |
| 4,116,389 A | 9/1978 | Furtah et al. |
| 4,122,816 A | 10/1978 | Fitzgerald et al. |
| 4,135,481 A | 1/1979 | Resler, Jr. |
| 4,172,921 A | 10/1979 | Kiefer |
| 4,183,467 A | 1/1980 | Sheraton et al. |
| 4,203,393 A | 5/1980 | Giardini |
| 4,281,797 A | 8/1981 | Kimata et al. |
| 4,293,188 A | 10/1981 | McMahon |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,544,096 A | 10/1985 | Burnett |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,700,891 A | 10/1987 | Hans et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | LaSota |
| 4,805,573 A | 2/1989 | Macfarlane et al. |
| 4,834,033 A | 5/1989 | Larsen |
| 4,841,925 A | 6/1989 | Ward |
| 4,877,187 A | 10/1989 | Daly |
| 4,905,962 A | 3/1990 | Iljin |
| 4,922,883 A | 5/1990 | Iwasaki |
| 4,932,263 A | 6/1990 | Wlodarczyk |
| 4,949,936 A | 8/1990 | Messina |
| 4,958,774 A | 9/1990 | Taylor |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,055,435 A | 10/1991 | Hamanaka et al. |
| 5,056,496 A | 10/1991 | Morino et al. |
| 5,069,189 A | 12/1991 | Saito |
| 5,072,617 A | 12/1991 | Weiss |
| 5,076,223 A | 12/1991 | Harden et al. |
| 5,094,429 A | 3/1992 | Dostert |
| 5,095,742 A | 3/1992 | James et al. |
| 5,107,673 A | 4/1992 | Sato et al. |
| 5,109,817 A | 5/1992 | Cherry |
| 5,131,376 A | 7/1992 | Ward et al. |
| 5,150,682 A | 9/1992 | Magnet |
| 5,163,623 A | 11/1992 | Seino |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,226,628 A | 7/1993 | Daly |
| 5,267,601 A | 12/1993 | Dwivedi |
| 5,297,518 A | 3/1994 | Cherry |
| 5,305,360 A | 4/1994 | Remark et al. |
| 5,325,888 A | 7/1994 | Stary |
| 5,328,094 A | 7/1994 | Goetzke et al. |
| 5,329,606 A | 7/1994 | Andreassen |
| 5,343,699 A | 9/1994 | McAlister |
| 5,377,633 A | 1/1995 | Wakeman |
| 5,388,984 A | 2/1995 | Meslif |
| 5,390,546 A | 2/1995 | Wlodarczyk |
| 5,392,745 A | 2/1995 | Beck |
| 5,394,838 A | 3/1995 | Chandler |
| 5,394,852 A | 3/1995 | McAlister |
| 5,421,195 A | 6/1995 | Wlodarczyk |
| 5,421,299 A | 6/1995 | Cherry |
| 5,427,132 A | 6/1995 | Fenner, Jr. |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |

(56) References Cited

U.S. PATENT DOCUMENTS

| | | | |
|---|---|---|---|
| 5,497,744 A | 3/1996 | Nagaosa et al. |
| 5,517,961 A | 5/1996 | Ward |
| 5,531,199 A | 7/1996 | Bryant et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,662,389 A | 9/1997 | Truglio et al. |
| 5,676,026 A | 10/1997 | Tsuboi et al. |
| 5,694,761 A | 12/1997 | Griffin |
| 5,697,554 A | 12/1997 | Auwaerter et al. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,704,553 A | 1/1998 | Wieczorek et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |
| 5,876,659 A | 3/1999 | Yasutomi et al. |
| 5,915,272 A | 6/1999 | Foley et al. |
| 5,930,420 A | 7/1999 | Atkins et al. |
| 5,941,207 A | 8/1999 | Anderson et al. |
| 5,947,091 A | 9/1999 | Krohn et al. |
| 5,975,032 A | 11/1999 | Iwata |
| 5,983,855 A | 11/1999 | Benedikt et al. |
| 6,000,628 A | 12/1999 | Lorraine |
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | VanDyne |
| 6,042,028 A | 3/2000 | Xu |
| 6,062,498 A | 5/2000 | Klopfer |
| 6,081,183 A | 6/2000 | Mading et al. |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,131,607 A | 10/2000 | Cooke |
| 6,138,639 A | 10/2000 | Hiraya et al. |
| 6,155,212 A | 12/2000 | McAlister |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,311,950 B1 | 11/2001 | Kappel et al. |
| 6,318,306 B1 | 11/2001 | Komatsu |
| 6,335,065 B1 | 1/2002 | Steinlage et al. |
| 6,338,445 B1 | 1/2002 | Lambert et al. |
| 6,340,015 B1 | 1/2002 | Benedikt et al. |
| 6,360,721 B1 | 3/2002 | Schuricht et al. |
| 6,371,439 B1 | 4/2002 | Trevisan |
| 6,374,781 B1 | 4/2002 | Kato |
| 6,378,485 B2 | 4/2002 | Elliott |
| 6,386,178 B1 | 5/2002 | Rauch |
| 6,446,597 B1 | 9/2002 | McAlister |
| 6,450,424 B1 * | 9/2002 | Horbelt ................ 239/585.1 |
| 6,453,660 B1 | 9/2002 | Johnson et al. |
| 6,455,173 B1 | 9/2002 | Marijnissen et al. |
| 6,455,451 B1 | 9/2002 | Brodkin et al. |
| 6,478,007 B2 | 11/2002 | Miyashita et al. |
| 6,490,391 B1 | 12/2002 | Zhao et al. |
| 6,494,382 B1 | 12/2002 | Stier |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,517,623 B1 | 2/2003 | Brodkin et al. |
| 6,520,434 B1 * | 2/2003 | Reiter ................ 239/585.5 |
| 6,531,712 B1 | 3/2003 | Boecking |
| 6,532,315 B1 | 3/2003 | Hung et al. |
| 6,536,405 B1 | 3/2003 | Rieger et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,550,458 B2 | 4/2003 | Yamakado et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,595,436 B2 | 7/2003 | Kirzhner et al. |
| 6,599,028 B1 | 7/2003 | Shu et al. |
| 6,615,810 B2 | 9/2003 | Funk et al. |
| 6,615,899 B1 | 9/2003 | Woodward et al. |
| 6,619,269 B1 | 9/2003 | Stier et al. |
| 6,621,964 B2 | 9/2003 | Quinn et al. |
| 6,647,948 B2 | 11/2003 | Kyuuma et al. |
| 6,663,027 B2 | 12/2003 | Jameson et al. |
| 6,668,630 B1 | 12/2003 | Kuglin et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Takeuchi et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,745,744 B2 | 6/2004 | Suckewer et al. |
| 6,748,918 B2 | 6/2004 | Rieger et al. |
| 6,749,043 B2 | 6/2004 | Brown et al. |
| 6,752,324 B1 | 6/2004 | Mattes |
| 6,755,175 B1 | 6/2004 | McKay et al. |
| 6,756,140 B1 | 6/2004 | McAlister |
| 6,763,811 B1 | 7/2004 | Tamol, Sr. |
| 6,776,352 B2 | 8/2004 | Jameson |
| 6,779,513 B2 | 8/2004 | Pellizzari et al. |
| 6,787,973 B2 | 9/2004 | Frank et al. |
| 6,796,516 B2 | 9/2004 | Maier et al. |
| 6,802,894 B2 | 10/2004 | Brodkin et al. |
| 6,811,103 B2 | 11/2004 | Gurich et al. |
| 6,814,313 B2 | 11/2004 | Petrone et al. |
| 6,832,472 B2 | 12/2004 | Huang et al. |
| 6,832,588 B2 | 12/2004 | Herden et al. |
| 6,840,493 B2 | 1/2005 | York et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,871,833 B1 | 3/2005 | Zeh et al. |
| 6,883,474 B2 | 4/2005 | Bucknor |
| 6,883,490 B2 | 4/2005 | Jayne |
| 6,892,971 B2 | 5/2005 | Rieger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,938,597 B2 | 9/2005 | Klein et al. |
| 6,940,213 B1 | 9/2005 | Heinz et al. |
| 6,954,074 B2 | 10/2005 | Zhu et al. |
| 6,955,154 B1 | 10/2005 | Douglas |
| 6,959,693 B2 | 11/2005 | Oda |
| 6,976,683 B2 | 12/2005 | Eckert et al. |
| 6,978,767 B2 | 12/2005 | Bonutti |
| 6,984,305 B2 | 1/2006 | McAlister |

(56) References Cited

U.S. PATENT DOCUMENTS

| | | |
|---|---|---|
| 6,993,960 B2 | 2/2006 | Benson |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,833 B2 | 4/2006 | Böcking |
| 7,032,845 B2 | 4/2006 | Dantes et al. |
| 7,066,399 B2 | 6/2006 | Hohl |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,077,379 B1 | 7/2006 | Taylor |
| 7,083,114 B2 | 8/2006 | Maeurer et al. |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,137,382 B2 | 11/2006 | Zhu et al. |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,198,208 B2 | 4/2007 | Dye et al. |
| 7,201,136 B2 | 4/2007 | McKay et al. |
| 7,204,133 B2 | 4/2007 | Benson et al. |
| 7,213,613 B2 | 5/2007 | Spakowski et al. |
| 7,214,883 B2 | 5/2007 | Leyendecker |
| 7,225,790 B2 | 6/2007 | Bartunek et al. |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,267,111 B2 | 9/2007 | Liskow |
| 7,272,487 B2 | 9/2007 | Christen et al. |
| 7,278,392 B2 | 10/2007 | Zillmer et al. |
| 7,305,971 B2 | 12/2007 | Fujii |
| 7,309,029 B2 | 12/2007 | Boecking |
| 7,309,032 B2 | 12/2007 | Fischer et al. |
| 7,340,118 B2 | 3/2008 | Wlodarczyk et al. |
| 7,367,319 B2 | 5/2008 | Kuo et al. |
| 7,386,982 B2 | 6/2008 | Runkle et al. |
| 7,404,395 B2 | 7/2008 | Yoshimoto |
| 7,409,929 B2 | 8/2008 | Miyahara et al. |
| 7,418,940 B1 | 9/2008 | Yi et al. |
| 7,419,103 B2 | 9/2008 | Pauer |
| 7,481,043 B2 | 1/2009 | Hirata et al. |
| 7,484,369 B2 | 2/2009 | Myhre |
| 7,513,222 B2 | 4/2009 | Orlosky |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,625,531 B1 | 12/2009 | Coates et al. |
| 7,626,315 B2 | 12/2009 | Nagase |
| 7,628,137 B1 | 12/2009 | McAlister |
| 7,650,873 B2 | 1/2010 | Hofbauer et al. |
| 7,694,855 B2 | 4/2010 | Chastine et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,728,489 B2 | 6/2010 | Heinz et al. |
| 7,849,833 B2 | 12/2010 | Toyoda |
| 7,850,091 B2 | 12/2010 | Boecking |
| 7,880,193 B2 | 2/2011 | Lam |
| 7,886,993 B2 | 2/2011 | Bachmaier et al. |
| 7,898,258 B2 | 3/2011 | Neuberth et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 8,069,836 B2 | 12/2011 | Ehresman |
| 8,091,528 B2 | 1/2012 | McAlister |
| 8,191,860 B2 | 6/2012 | Eschborn et al. |
| 8,267,063 B2 | 9/2012 | McAlister |
| 8,297,254 B2 | 10/2012 | McAlister |
| 8,311,723 B2 | 11/2012 | McAlister |
| 2002/0017573 A1 | 2/2002 | Sturman |
| 2002/0070287 A1 | 6/2002 | Jameson et al. |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131686 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0162900 A1* | 11/2002 | Boecking .................. 239/102.2 |
| 2002/0166536 A1 | 11/2002 | Hitomi et al. |
| 2003/0012985 A1 | 1/2003 | McAlister |
| 2003/0038259 A1 | 2/2003 | Boecking |
| 2003/0042325 A1 | 3/2003 | D'Arrigo |
| 2003/0127531 A1 | 7/2003 | Hohl |
| 2003/0160202 A1 | 8/2003 | Boecking |
| 2003/0192965 A1* | 10/2003 | Maier et al. ................. 239/585.1 |
| 2004/0008989 A1 | 1/2004 | Hung |
| 2005/0045146 A1 | 3/2005 | McKay et al. |
| 2005/0098663 A1* | 5/2005 | Ishii ............................ 239/584 |
| 2005/0255011 A1 | 11/2005 | Greathouse et al. |
| 2005/0257776 A1 | 11/2005 | Bonutti |
| 2006/0005738 A1 | 1/2006 | Kumar |
| 2006/0005739 A1 | 1/2006 | Kumar |
| 2006/0016916 A1 | 1/2006 | Petrone et al. |
| 2006/0037563 A1 | 2/2006 | Raab et al. |
| 2006/0102140 A1 | 5/2006 | Sukegawa et al. |
| 2006/0108452 A1 | 5/2006 | Anzinger et al. |
| 2006/0169244 A1 | 8/2006 | Allen |
| 2006/0255185 A1* | 11/2006 | Cristiani et al. ........... 239/533.7 |
| 2007/0142204 A1 | 6/2007 | Park et al. |
| 2007/0189114 A1 | 8/2007 | Reiner et al. |
| 2007/0283927 A1 | 12/2007 | Fukumoto et al. |
| 2008/0072871 A1 | 3/2008 | Vogel et al. |
| 2008/0081120 A1 | 4/2008 | Van Ooij et al. |
| 2008/0098984 A1 | 5/2008 | Sakamaki |
| 2008/0103672 A1 | 5/2008 | Ueda et al. |
| 2009/0078798 A1 | 3/2009 | Gruendl et al. |
| 2009/0093951 A1 | 4/2009 | McKay et al. |
| 2009/0200406 A1 | 8/2009 | Kronberger |
| 2009/0204306 A1 | 8/2009 | Goeke et al. |
| 2009/0264574 A1 | 10/2009 | Van Ooij et al. |
| 2010/0020518 A1 | 1/2010 | Bustamante |
| 2010/0077986 A1 | 4/2010 | Chen |
| 2010/0108023 A1 | 5/2010 | McAlister |
| 2010/0183993 A1 | 7/2010 | McAlister |
| 2011/0036309 A1 | 2/2011 | McAlister |
| 2011/0042476 A1 | 2/2011 | McAlister |
| 2011/0048371 A1 | 3/2011 | McAlister |
| 2011/0048374 A1 | 3/2011 | McAlister |
| 2011/0048381 A1 | 3/2011 | McAlister |
| 2011/0056458 A1 | 3/2011 | McAlister |
| 2011/0057058 A1 | 3/2011 | McAlister |
| 2011/0132319 A1 | 6/2011 | McAlister |
| 2011/0146619 A1 | 6/2011 | McAlister |
| 2011/0210182 A1 | 9/2011 | McAlister |
| 2011/0233308 A1 | 9/2011 | McAlister |
| 2011/0253104 A1 | 10/2011 | McAlister |
| 2011/0297753 A1 | 12/2011 | McAlister et al. |
| 2012/0204831 A1 | 8/2012 | McAlister |

FOREIGN PATENT DOCUMENTS

| | | |
|---|---|---|
| EP | 392594 A2 | 10/1990 |
| EP | 671555 A1 | 9/1995 |
| EP | 1209351 | 5/2002 |
| EP | 1972606 A1 | 9/2008 |
| EP | 2402587 B1 | 12/2012 |
| GB | 1038490 A | 8/1966 |
| JP | 61-023862 A | 2/1986 |
| JP | 02-259268 A | 10/1990 |
| JP | 08-049623 A | 2/1996 |
| JP | 08-334077 A | 12/1996 |

(56) References Cited

FOREIGN PATENT DOCUMENTS

| | | |
|---|---|---|
| JP | 2001-512564 | 8/2001 |
| JP | 2004-324613 A | 11/2004 |
| JP | 2006-97659 | 4/2006 |
| JP | 2006-105067 | 4/2006 |
| JP | 2008-31853 | 2/2008 |
| JP | 2008-520888 | 6/2008 |
| KR | 2007-0026296 A | 3/2007 |
| KR | 2008-0073635 A | 8/2008 |
| WO | 9407022 | 3/1994 |
| WO | WO-2008-017576 A1 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Final Office Action for U.S. Appl. No. 13/027,051; Applicant: McAlister Technologies, LLC; Date of Mailing: Oct. 20, 2011, 10 pages.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/002077; Applicant: McAlister Technologies, LLC.; Date of Mailing: Apr. 29, 2011 (8 pages).

International Search Report and Written Opinion for Application No. PCT/US2010/002078; Applicant: McAlister Technologies, LLC.; Date of Mailing: Dec. 17, 2010 (9 pages).

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/042812; Applicant: McAlister Technologies, LLC.; Date of Mailing: May 13, 2011 (9 pages).

International Search Report and Written Opinion for Application No. PCT/US2010/042815; Applicant: McAlister Technologies, LLC.; Date of Mailing: Apr. 29, 2011 (10 pages).

International Search Report and Written Opinion for Application No. PCT/US2010/042817; Applicant: McAlister Technologies, LLC.; Date of Mailing: Apr. 29, 2011 (8 pages).

International Search Report and Written Opinion for Application No. PCT/US2010/054361; Applicant: McAlister Technologies, LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

International Search Report and Written Opinion for Application No. PCT/US2011/024778 Applicant: McAlister Technologies, LLC.; Date of Mailing: Sep. 27, 2011 (10 pages).

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Non-Final Office Action for U.S. Appl. No. 12/006,774; Applicant: McAlister Technologies, LLC; Date of Mailing: Jan. 30, 2009, 18 pages.

Non-Final Office Action for U.S. Appl. No. 12/581,825; Applicant: McAlister Technologies, LLC; Date of Mailing: Mar. 25, 2011 (15 pages).

Non-Final Office Action for U.S. Appl. No. 12/804,510; Applicant: McAlister Technologies, LLC; Date of Mailing: Mar. 1, 2011 (10 pages).

Non-Final Office Action for U.S. Appl. No. 12/961,453; Applicant: McAlister Technologies, LLC; Date of Mailing: Jun. 9, 2011 (4 pages).

Non-Final Office Action for U.S. Appl. No. 12/961,461; Applicant: McAlister et al.; Date of Mailing: Jan. 17, 2012, 39 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

Notice of Allowance for U.S. Appl. No. 12/006,774; Applicant: McAlister Technologies, LLC; Date of Mailing: Jul. 27, 2009, 20 pages.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

* cited by examiner

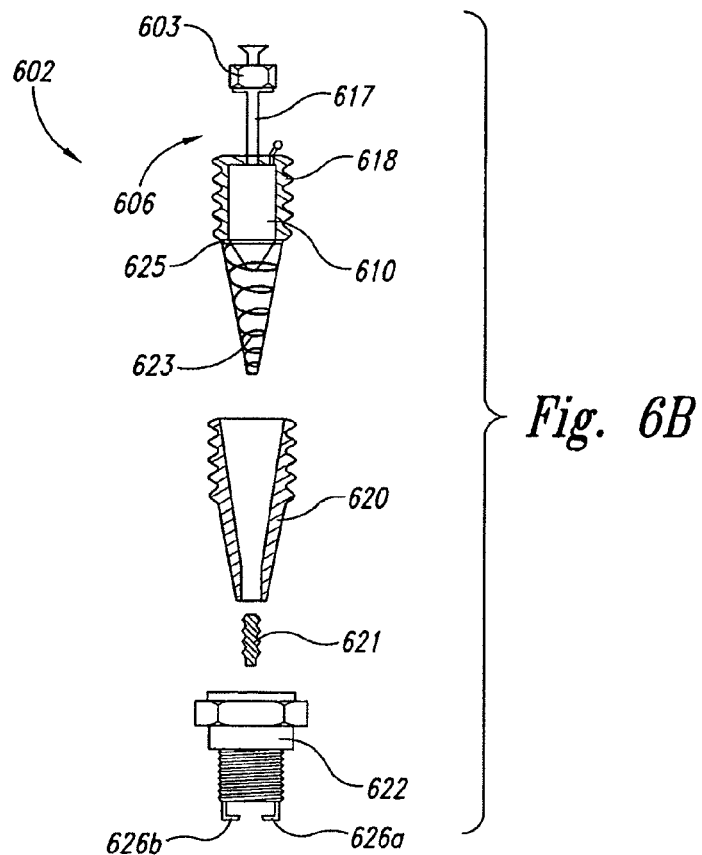
*Fig. 6B*
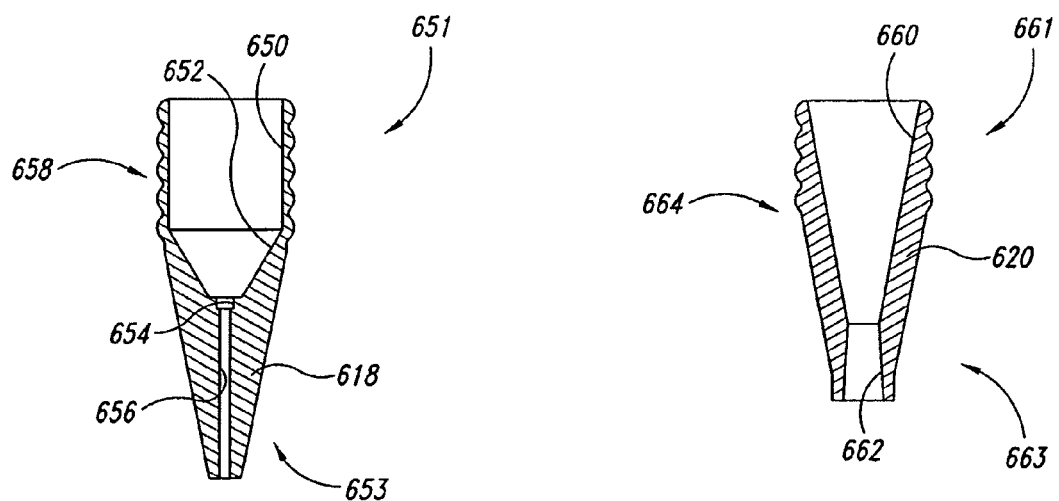
*Fig. 6C*  *Fig. 6D*

FUEL INJECTOR ACTUATOR ASSEMBLIES AND ASSOCIATED METHODS OF USE AND MANUFACTURE

CROSS-REFERENCE TO RELATED APPLICATION(S)

The present application is a continuation of U.S. patent application Ser. No. 12/804,510, filed Jul. 21, 2010 and titled FUEL INJECTOR ACTUATOR ASSEMBLIES AND ASSOCIATED METHODS OF USE AND MANUFACTURE, which claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; PCT Application No. PCT/US09/67044, filed Dec. 7, 2009 and titled INTEGRATED FUEL INJECTORS AND IGNITERS AND ASSOCIATED METHODS OF USE AND MANUFACTURE; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. U.S. patent application Ser. No. 12/804,510 is a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. U.S. patent application Ser. No. 12/804,510 is a continuation-in-part of U.S. patent application Ser. No. 12/581,825, filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety.

TECHNICAL FIELD

The following disclosure relates generally to integrated fuel injectors and igniters and associated components for directly injecting and igniting various fuels in a combustion chamber.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Fuel injectors used in these fuel injection systems are generally capable of two basic functions. First, they deliver a metered amount of fuel for each inlet stroke of the engine so that a suitable air-fuel ratio can be maintained for the fuel combustion. Second they disperse the fuel to improve the efficiency of the combustion process. Conventional fuel injection systems are typically connected to a pressurized fuel supply, and the fuel can be metered into the combustion chamber by varying the time for which the injectors are open. The fuel can also be dispersed into the combustion chamber by forcing the fuel through a small orifice in the injectors.

BRIEF DESCRIPTION OF THE DRAWINGS

FIG. 6A is a cross-sectional side view and FIG. 6B is a partially exploded cross-sectional side view of an injector configured in accordance with another embodiment of the disclosure.

FIGS. 6C and 6D are cross-sectional side views illustrating several features of components of the injector of FIGS. 6A and 6B.

DETAILED DESCRIPTION

Figure 1A:
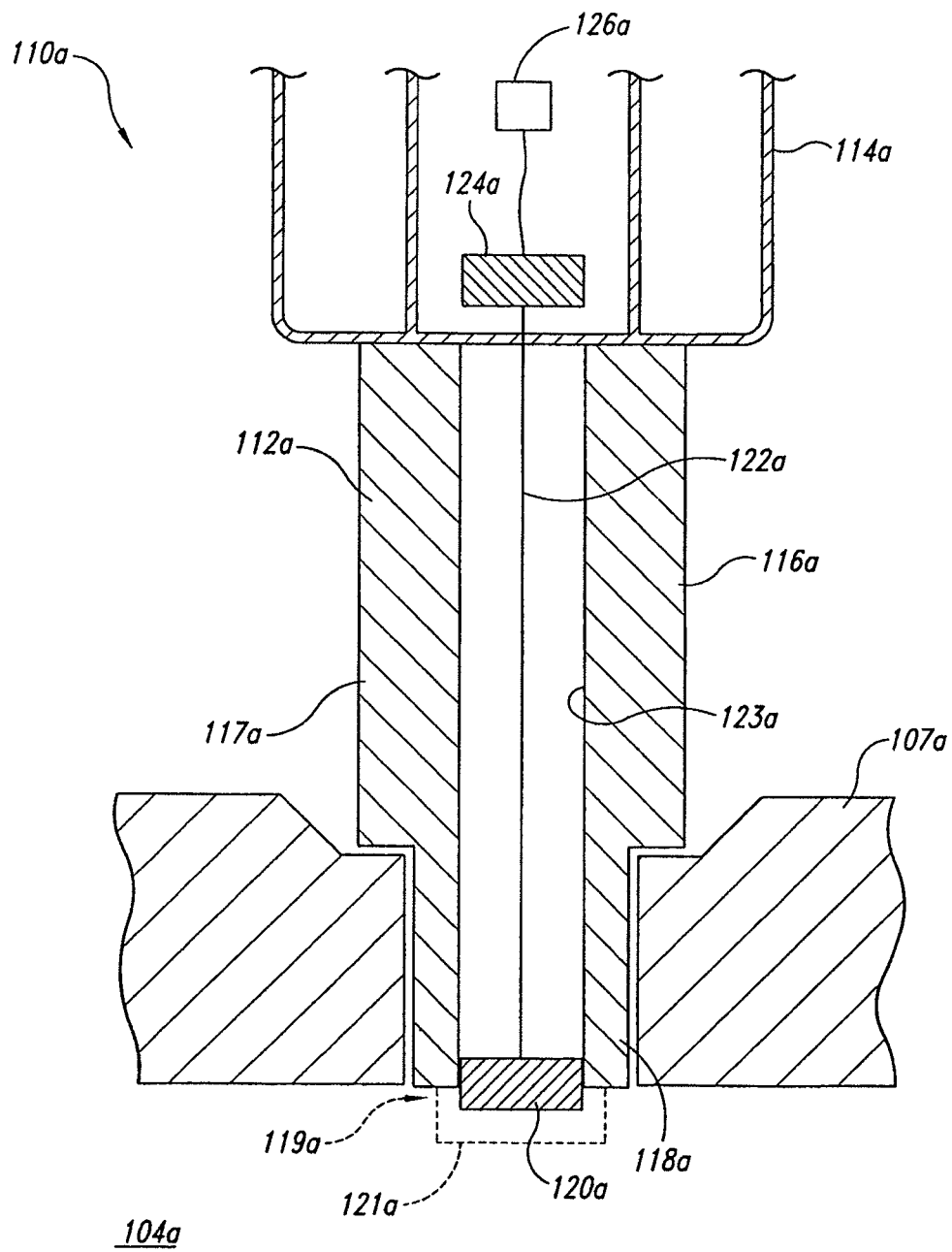
FIG. 1A is a schematic cross-sectional side view of an injector configured in accordance with an embodiment of the disclosure.

The present application incorporates by reference in their entirety the subject matter of each of the following U.S. patent applications, filed on Jul. 21, 2010 and titled: INTEGRATED FUEL INJECTORS AND IGNITERS AND ASSOCIATED METHODS OF USE AND MANUFACTURE (U.S. Pat. No.

8,635,985); INTEGRATED FUEL INJECTORS AND IGNITERS WITH CONDUCTIVE CABLE ASSEMBLIES (U.S. Pat. No. 8,413,634); SHAPING A FUEL CHARGE IN A COMBUSTION CHAMBER WITH MULTIPLE DRIVERS AND/OR IONIZATION CONTROL (U.S. Pat. No. 8,365,700); CERAMIC INSULATOR AND METHODS OF USE AND MANUFACTURE THEREOF (U.S. Pat. No. 8,192,852); METHOD AND SYSTEM OF THERMOCHEMICAL REGENERATION TO PROVIDE OXYGENATED FUEL, FOR EXAMPLE, WITH FUEL-COOLED FUEL INJECTORS (U.S. Pat. No. 8,561,598); and METHODS AND SYSTEMS FOR REDUCING THE FORMATION OF OXIDES OF NITROGEN DURING COMBUSTION IN ENGINES (U.S. Pat. No. 8,387,599).

Overview

The present disclosure describes devices, systems, and methods for providing a fuel injector configured to be used with multiple fuels and to include an integrated igniter. The disclosure further describes integrated fuel injection and ignition devices for use with internal combustion engines, as well as associated systems, assemblies, components, and methods regarding the same. For example, several of the embodiments described below are directed generally to adaptable fuel injectors/igniters that can optimize the injection and combustion of various fuels based on combustion chamber conditions. Certain details are set forth in the following description and in FIGS. 1A-9 to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

FIG. 1A is a schematic cross-sectional side view of an integrated injector/igniter 110a ("injector 110a") configured in accordance with an embodiment of the disclosure. The injector 110a illustrated in FIG. 1A is configured to inject different fuels into a combustion chamber 104a and to be controlled to adaptively adjust the pattern and/or frequency of the fuel injections or bursts based on combustion properties and conditions in the combustion chamber 104a. As explained in detail below, the injector 110a and other injectors described herein can optimize the injected fuel for rapid ignition and complete combustion. In addition to injecting the fuel, the injector 110a includes one or more integrated ignition features that are configured to ignite the injected fuel. As such, the injector 110a can be utilized to convert conventional internal combustion engines to be able to operate on multiple different fuels. Although several of the features of the illustrated injector 110a are shown schematically for purposes of illustration, several of these schematically illustrated features are described in detail below with reference to various features of embodiments of the disclosure. Accordingly, the relative location, position, size, orientation, etc. of the schematically illustrated components of the injector in FIG. 1A are not intended to limit the present disclosure.

In the illustrated embodiment, the injector 110a includes a casing or body 112a having a middle portion 116a extending between a base portion 114a and a nozzle portion 118a. The nozzle portion 118a extends at least partially through a port in an engine head 107a to position an end portion 119a of the nozzle portion 118a at the interface with the combustion chamber 104a. The injector 110a further includes a fuel passage or channel 123a extending through the body 112a from the base portion 114a to the nozzle portion 118a. The channel 123a is configured to allow fuel to flow through the body 112a. The channel 123a is also configured to allow other components, such as an actuator 122a, instrumentation components, and/or energy source components of the injector 110a to pass through the body 112a. In certain embodiments, the actuator 122a can be a cable or rod that has a first end portion that is operatively coupled to a flow control device or valve 120a carried by the end portion 119a of the nozzle portion 118a. The actuator 122a can be integral with the valve 120a or a separate component that is attached to the valve 120a. As such, the flow valve 120a is positioned proximate to the interface with the combustion chamber 104a. Although not shown in FIG. 1A, in certain embodiments the injector 110a can include more than one flow valve, as well as one or more check valves positioned proximate to the combustion chamber 104a, as well as at other locations on the body 112a.

According to another feature of the illustrated embodiment, the actuator 122a also includes a second end portion operatively coupled to a plunger or driver 124a. The second end portion can further be coupled to a controller or processor 126a. The controller or processor 126a can be positioned on the injector 110a or remotely from the injector 110a. As explained in detail below with reference to various embodiments of the disclosure, the controller 126a and/or the driver 124a are configured to rapidly and precisely actuate the actuator 122a to inject fuel into the combustion chamber 104a via the flow valve 120a. For example, in certain embodiments, the flow valve 120a can move outwardly (e.g., toward the combustion chamber 104a) and in other embodiments the flow valve 120a can move inwardly (e.g., away from the combustion chamber 104a) to meter and control injection of the fuel. Moreover, in certain embodiments, the driver 124a can tension the actuator 122a to retain the flow valve 120a in a closed or seated position, and the driver 124a can relax or relieve the tension in the actuator 122a to allow the flow valve 120a to inject fuel, and vice versa. The driver 124a can be responsive to the controller 126a as well as other force inducing components (e.g., acoustic, electromagnetic and/or piezoelectric components) to achieve the desired frequency and pattern of the injected fuel bursts.

In certain embodiments, the actuator 122a can include one or more integrated sensing and/or transmitting components to detect Combustion chamber properties and conditions. For example, the actuator 122a can be formed from fiber optic cables, insulated transducers integrated within a rod or cable, or can include other sensors to detect and communicate combustion chamber data. Although not shown in FIG. 1A, in other embodiments, and as described in detail below, the injector 110a can include other sensors or monitoring instrumentation located at various positions on the injector 110a. For example, the body 112a can include optical fibers integrated into the material of the body 112a. In addition, the flow valve 120a can be configured to sense or carry sensors in order to transmit combustion data to one or more controllers associated with the injector 110a. This data can be transmitted via wireless, wired, optical or other transmission mediums to the controller 126a or other components. Such feedback enables extremely rapid and adaptive adjustments for optimization of fuel injection factors and characteristics including, for example, fuel delivery pressure, fuel injection initiation timing, fuel injection durations for production of multiple layered or stratified charges, combustion chamber pressure and/or temperature, the timing of one, multiple or continuous plasma ignitions or capacitive discharges, etc.

Such feedback and adaptive adjustment by the controller 126a, driver 124a, and/or actuator 126a also allows optimization of outcomes such as power production, fuel economy, and reduction or elimination of formation pollutive emissions including oxides of nitrogen. U.S. Patent Application Publication No. 2006/0238068, which is incorporated herein by reference in its entirety, describes suitable drivers for actuating ultrasonic transducers in the injector 110a and other injectors described herein.

The injector 110a can also optionally include an ignition and flow adjusting device or cover 121a (shown in broken lines in FIG. 1A) carried by the end portion 119a adjacent to the engine head 107a. The cover 121a at least partially encloses or surrounds the flow valve 120a. The cover 121a may also be configured to protect certain components of the injector 110a, such as sensors or other monitoring components. The cover 121a can also act as a catalyst, catalyst carrier and/or first electrode for ignition of the injected fuels. Moreover, the cover 121a can be configured to affect the shape, pattern, and/or phase of the injected fuel. The flow valve 120a can also be configured to affect these properties of the injected fuel. For example, in certain embodiments the cover 121a and/or the flow valve 120a can be configured to create sudden gasification of the fuel flowing past these components. More specifically, the cover 121a and/or the flow valve 120a can include surfaces having sharp edges, catalysts, or other features that produce gas or vapor from the rapidly entering liquid fuel or mixture of liquid and solid fuel. The acceleration and/or frequency of the flow valve 120a actuation can also gasify the injected fuel. In operation, this sudden gasification causes the vapor or gas emitted from the nozzle portion 118a to more rapidly and completely combust. Moreover, this sudden gasification may be used in various combinations with super heating liquid fuels and plasma or acoustical impetus of projected fuel bursts. In still further embodiments, the frequency of the flow valve 120a actuation can induce plasma projection to beneficially affect the shape and/or pattern of the injected fuel. U.S. Pat. No. 4,122,816, which is incorporated herein by reference in its entirety, describes suitable drivers for actuating plasma projection by injector 110a and other injectors described herein.

According to another aspect of the illustrated embodiment, and as described in detail below, at least a portion of the body 112a is made from one or more dielectric materials 117a suitable to enable the high energy ignition to combust differ-ent fuels, including unrefined fuels or low energy density fuels. These dielectric materials 117a can provide sufficient electrical insulation of the high voltage for the production, isolation, and/or delivery of spark or plasma for ignition. In certain embodiments, the body 112a can be made from a single dielectric material 117a. In other embodiments, however, the body 112a can include two or more dielectric materials. For example, at least a segment of the middle portion 116a can be made from a first dielectric material having a first dielectric strength, and at least a segment of the nozzle portion 118a can be made from a dielectric material having a second dielectric strength that is greater than the first dielectric strength. With a relatively strong second dielectric strength, the second dielectric can protect the injector 110a from thermal and mechanical shock, fouling, voltage tracking, etc. Examples of suitable dielectric materials, as well as the locations of these materials on the body 112a, are described in detail below.

In addition to the dielectric materials, the injector 110a can also be coupled to a power or high voltage source to generate the ignition event to combust the injected fuels. The first electrode can be coupled to the power source (e.g., a voltage generation source such as a capacitance discharge, induction, or piezoelectric system) via one or more conductors extending through the injector 110a. Regions of the nozzle portion 118a, the flow valve 120a, and/or the cover 121a can operate as a first electrode to generate an ignition event (e.g., spark, plasma, compression ignition operations, high energy capacitance discharge, extended induction sourced spark, and/or direct current or high frequency plasma, in conjunction with the application of ultrasound to quickly induce, impel, and complete combustion) with a corresponding second electrode of the engine head 107a. As explained in detail below, the first electrode can be configured for durability and long service life. In still further embodiments of the disclosure, the injector 110a can be configured to provide energy conversion from combustion chamber sources and/or to recover waste heat or energy via thermochemical regeneration to drive one or more components of the injector 110a from the energy sourced by the combustion events.

The features of the injector 110a described above with reference to FIG. 1A can be included in any of the embodiments described below with reference to FIGS. 1B-9.

Figure 1B:
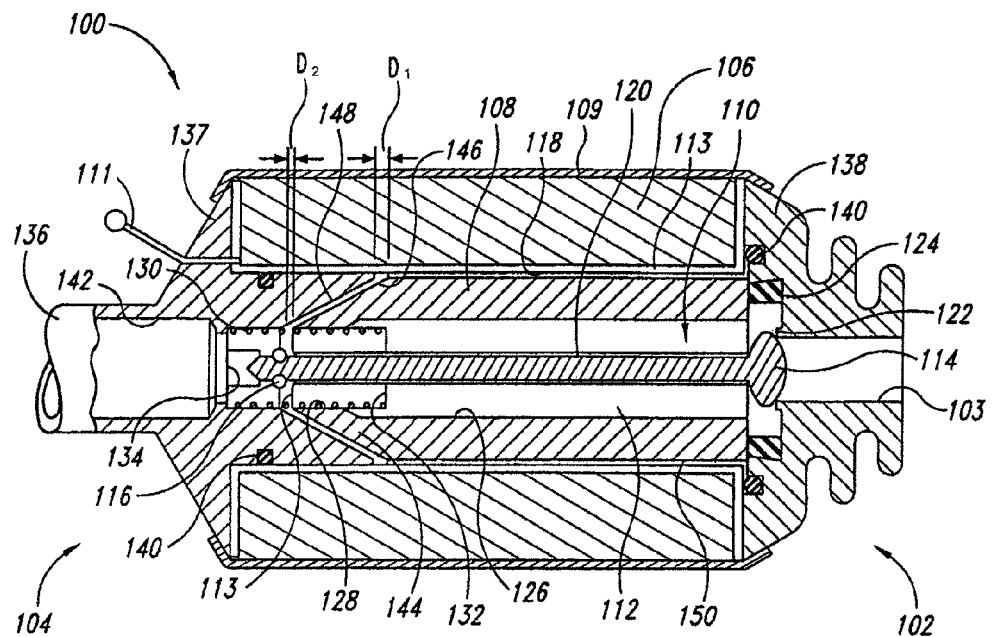
FIG. 1B is a cross-sectional side view of an injector configured in accordance with another embodiment of the disclosure.

Additional Embodiments of Integrated Fuel Injectors and Igniters and Associated Components FIG. 1B is a cross-sectional side view of an injector 100 configured in accordance with an embodiment of the disclosure, that includes combined fuel injection and ignition features. As described in detail below, the illustrated embodiment of the injector 100 includes an electromagnetic actuator assembly and corresponding valve assembly that provide a rugged and versatile yet mechanically eloquent assembly for precisely metering fuel to achieve the desired fuel flow characteristics. In the illustrated embodiment, the injector 100 includes several features that are generally similar in structure and function to the corresponding features of the injector 110a described above with reference to FIG. 1A. For example, the injector 100 includes a nozzle portion 102 opposite a base portion 104. The nozzle portion 102 is configured to at least partially extend through a port in an engine head to position the end of the nozzle portion 102 at an interface with a combustion chamber. As described in detail below, the base portion 104 is configured to receive one or more fuels from a fuel source (e.g., a pressurized fuel source), and the nozzle portion 102 is configured to deliver and/or precisely meter the fuel into the combustion chamber through a fuel exit passage 103.

In the illustrated embodiment, the injector 100 includes a force generator 106 that actuates a plunger or driver 108 to in turn move a valve assembly 110. The force generator 106 is positioned within a bobbin or housing 109, such as a conductive metallic casing. Suitable materials for the force generator bobbin or housing 109 include, for example, beryllia and various graphite, silver, and/or aluminum-filled polymers that are designed to enhance heat transfer. The force generator 108 and/or the housing 109 can also be coupled to voltage source or other suitable energy source 111, as well as a controller. In certain embodiments, the force generator 106 can be solenoid winding that is an electromagnetic force generator, a piezoelectric force generator, or other suitable type of force generator for moving the driver 108.

The valve assembly 110 includes an actuator 112 (e.g., a cable, stiffened cable, rod, valve extension, etc.) having a flow valve 114 at the nozzle portion 102, and an actuator stop 116 at the base portion 104 opposite the nozzle portion 102. In certain embodiments, the flow valve 114 can be integrally formed with the actuator 112. In other embodiments, however, the flow valve 114 can be separate from and attached to the actuator 112. Moreover, in certain embodiments the stop 116 can be a wire, such as a constrictive spring wire, that is attached to the second end portion of the actuator 112. For example, the stop 116 can be at least partially embedded in an annular groove in the actuator 112, the annular groove having a depth of at least approximately 50% of the diameter of the motion stop 116. In other embodiments, however, the stop 116 and other actuator stops disclosed herein can be any other type of protrusion on the actuator 112 that is attached to or integrally formed with the actuator 112. Moreover, in still further embodiments, the stop 116 can be an attractive element, such as a magnet or permanent magnet. The stop 116 is positioned on the actuator 112 to contact a contact surface 113 of the driver 108 when the force generator 106 actuates the driver 108 to move the actuator 112 and consequently open the flow valve 114:

In the closed position the flow valve 114 rests against a valve seat 122 in the nozzle portion 102. In certain embodiments, the surface of the flow valve 114 that contacts the valve seat 122 can be a generally spherical or conical surface that is fine finished or polished for sealing against the valve seat 122. The nozzle portion 102 can also include a biasing or attractive element 124, such as a magnet, permanent magnet, etc., that attracts the driver 108 towards the nozzle portion 102 to at least partially retain the valve 114 in the closed position against the valve seat 122. For example, the attractive element 124 can be coupled to a controller or computer and selectively attract the driver 108 towards the nozzle portion 102. In other embodiments, actuation of the driver 108 can overcome the attractive force of the attractive element 124. As described in detail below, the valve 114 can also be retained in the closed position with other biasing components and/or fuel pressure within the injectors 100.

The driver 108 is positioned in a driver cavity 118 in the injector 100 to allow the driver 108 to move longitudinally through the injector 100 in response to excitation from the force generator 106. Moreover, the actuator 112 is positioned in an actuator cavity or opening 120 extending longitudinally through the driver 108. The actuator opening 120 thereby allows the driver 108 to move longitudinally in the injector 100 with reference to the actuator 112 until the driver 108 contacts the actuator stop 116. In the illustrated embodiment, the driver 108 also includes a fuel cavity 126 extending longitudinally therethrough and spaced radially apart from the actuator opening 120. The fuel cavity 126 is fluidly coupled to a fuel passageway or channel 128 in the base portion 104. The fuel channel 128 is also coupled to a fuel conduit 136, which is in turn coupled to a fuel source, such as a pressurized fuel source. In certain embodiments, the fuel conduit 136 can include a fuel filter 142 configured to filter or otherwise condition the fuel prior to entering the body of the injector 100.

In the illustrated embodiment, the base portion 104 also includes a biasing member 130 (e.g., a spring such as a coiled compression spring) positioned in the fuel channel 128. The biasing member 130 contacts a first biasing surface 132 of the driver 108, as well as a second biasing surface 134 of the fuel channel 128. In this manner, the biasing member 130 urges the driver 108 towards the nozzle portion 102 to retain the actuator 112 and corresponding flow valve 114 in the closed position.

The force generator housing 109 is coupled to a first end cap 137 at the base portion 104, and a second end cap 138 at the nozzle portion 102. The housing 109 can be attached (e.g., hermetically sealed via soldering, brazing, welding, structurally adhesive sealing, etc.) to each of the first and second end caps 137, 138 to prevent fuel from escaping from the injector 100. Seals 140, such as o-rings, can also be used to maintain a fluid tight connection between the housing 109 and the first and second end caps 137, 138.

According to another aspect of the illustrated embodiment, an end portion 144 of the driver 108 in the base portion 104 has a generally conical or frustoconical shape. More specifically, the end portion 144 of the driver 108 has an outer end surface 146 that has a generally conical or frustoconical shape. The outer end surface 146 of the driver 108 is spaced apart from a corresponding contact surface 148 of the first end cap 137 having a matching contour or shape. When the flow valve 114 is in the closed position against the valve seat 122 and the driver 108 is in a relaxed or non-actuated state, the outer end surface 146 is spaced apart from the contact surface 148 of the end cap 137 by a first distance $D_1$. In addition, at this position the contact surface 113 of the driver 108 is spaced apart from the stop 116 on the actuator 112 by a second distance $D_2$. The second distance $D_2$ accordingly allows the driver 108 to gain momentum before striking the stop 116 of the actuator 112. For example, the first distance $D_1$ is the total distance that the driver 108 travels to move the flow valve 114 via the actuator 112 to open the flow valve 114. More specifically, first distance $D_1$ is at least approximately equal to the second distance $D_2$ plus the distance that the flow valve 114 moves to be sufficiently spaced apart from the valve seat 122 to inject the fuel into the combustion chamber. In one embodiment, the second distance $D_2$ can be between approximately 10% to 40% of the first distance $D_1$. In other embodiments, however, the second distance $D_2$ can be less than 10% or greater than 40% of first distance $D_1$. In still other embodiments, the second distance $D_2$ can be eliminated from the injector 100 such that the driver 108 contacts the actuator stop 116 when the valve is in the closed position.

In operation, the fuel conduit 136 introduces fuel through the fuel filter 142 into the base portion 104 of the injector 100. As the fuel flows through the injector 100, a controller can precisely power the force generator 106 to actuate the driver 108, which in turn moves the actuator 112 to lift the flow valve 114 off of the valve seat 122 (i.e., to move the flow valve 114 inwardly). The actuated driver 108 can accordingly overcome the biasing force of the biasing member 130 and/or the attractive element 124 to move away from the nozzle portion 102. Moreover, the illustrated embodiment allows for operation of the flow valve 114 at relatively high pressure differentials by allowing the driver 108 to gain considerable momentum and associated kinetic energy while moving the distance $D_2$ prior to impacting the actuator stop 116 to move the valve 114. As such, the driver 108 can overcome a considerable pressure gradient to move the flow valve 114. In embodiments where the second distance $D_2$ is eliminated, the driver 108 can directly or instantly move the actuator 112 in response to current flow in the force generator 106.

Interruption of the current in the force generator 106 in response to the controller allows fuel flow and the resulting pressure, the biasing member 130, and/the or attractive element 124 to urge or force the driver 108 to the normally closed position, which in turn allows the flow valve 114 to return to the normally closed position. For example, a distal end portion of the driver 108 can contact or otherwise move the flow valve 114 to the closed position on the valve seat 122. Subsequent application of current to the force generator 106 can move the driver 108 to contact the actuator 112 and again move or lift the valve 114 off the valve seat 122 to inject fuel into the combustion chamber.

In addition to filtering particles and debris from the fuel, the filter 142 at the base portion 104 can also function as a catalytic processor for preventing any monatomic or ionic hydrogen from further passage into the injector 100, including into the fuel channel 128, which houses the biasing member 130. This purpose is supported by the finding that steel alloys do not become embrittled by diatomic hydrogen ($H_2$) even though exposure to monatomic hydrogen and ionic hydrogen, as may be encountered during welding operations, in acidic environments, and during metal plating operations, causes degradation and embrittlement of such alloys. Accordingly, the filter 142 can prevent the adverse degradation of the biasing member 130 by hydrogen embrittlement. Equations F1 and F2 below summarize the elimination of the hydrogen ions and atomic hydrogen by the catalytic action of the filter 142.

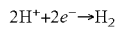
$$2H^+ + 2e^- \rightarrow H_2 \qquad \text{Equation F1}$$

$$2H \rightarrow H_2 \qquad \text{Equation F2}$$

In the process of Equation F1, electrons are supplied by grounding the injector 100 to an electron source via the metallic fuel conduit 136. Electrons may also be supplied for accomplishing the process of Equation F1 by grounding one end of force generator 106 to the conductive housing 109. Nucleation of diatomic hydrogen from monatomic hydrogen can be assured by various agents and compounds, including for example, oxides such as zinc oxide, tin oxide, chromia, alumina, and silica that may be incorporated in the filter 142 as fibers and/or particles including surfaces of substrates such as aluminum and/or aluminum-silicon alloys. Such fibers, particles, and/or other suitable forms made of metals and/or alloys such as aluminum, magnesium, or zinc can also serve as catalysts in the filter 142. Similarly chemical vapor deposition and/or sputtered deposits of these metals on various substrates, followed by partial oxidation, can be positioned in the filter 142 to provide catalytic processing as summarized by Equations F1 and F2. Fuels that provide oxidizing potential, such as "oxygenated" fuels that contain water vapor that enables self-healing of such metal oxides, as described in U.S. Provisional Patent Application No. 61/237,425 title OXYGENATED FUEL PRODUCTION, filed Aug. 27, 2009. In embodiments where high strength alloy materials, such as music wire, spring steel, precipitation-hardened (PH) steel, or a chrome-silicon steel alloy, are selected for the biasing member 130, additional protection may also be provided by plating the biasing member 130 with protective metals such as aluminum. For example, the biasing member 130 can be plated with any suitable plating methods including, for example, hot dip, electrolytic, chemical vapor, and/or sputtering processes.

The injector 100 of the illustrated embodiment is also capable of dispensing very high pressure fuels, including hydrogen-characterized fuels that are produced as mixtures of methane from anaerobic digestion, thermal dissociation, or natural gas sources, as well as hydrogen produced by electrolysis, pyrolysis, or reformation of selected hydrocarbons. Such pressurized fuels, such as 10,000 psi hydrogen, methane, ammonia, or other hydrogen characterized mixtures can be supplied to the injector 100 and precisely metered by the injector 100 to achieve desired fuel bursts.

According to another feature of the illustrated embodiment, the driver 108 is proportioned as a relatively long component in the injector 100. More specifically, the longitudinal length of the driver 108 and the corresponding longitudinal length of the force generator 106 may be several times larger than the diameter of driver 108. This can allow or otherwise facilitate cooling of these components by fuel that is flowing through the injector 100. More specifically, the fuel flowing thought the injector 100 can cool the driver 108 and/or force generator 106. For example, as fuel flows along a fuel channel or passage 113 extending longitudinally along the injector 100, as well as through the driver 108 in the fuel bore or cavity 126, and/or around the driver 108 in a second fuel bore or passageway 150 in the driver cavity 118 generally surrounding the driver 108, the fuel can absorb heat from the driver 108. This is advantageous in many applications in modern overhead valve engines that virtually eliminate the opportunity to reject heat to the exterior surroundings of the injector because the temperature of the environment around and/or under the engine's valve cover generally approaches the operating limit of polymer compounds that insulate the magnet wire in the force generator 106.

Figure 2:
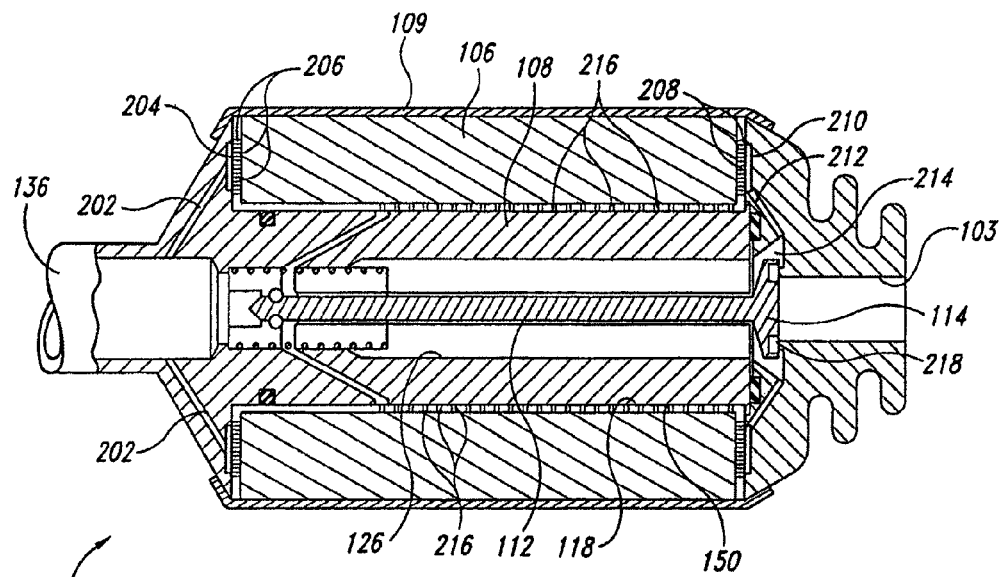
FIG. 2 is a cross-sectional side partial view of an injector configured in accordance with another embodiment of the disclosure.

FIG. 2 is a cross-sectional side partial view of an injector 200 configured in accordance with another embodiment of the disclosure. The injector 200 includes several features that are generally similar in structure and function to the corresponding features of the injector 100 illustrated in FIG. 1B and other injectors disclosed herein. For example, the injector 200 illustrated in FIG. 2 includes the fuel conduit 136, the force generator 106, the driver 108, and the corresponding actuator 112 and associated flow valve 114. The illustrated injector 200 also includes a biasing or attractive element 212 (e.g., a ring magnet or a permanent ring magnet) to attract or force the driver 108 to the normally closed position. The valve 114 can also include a seal 218, such as a ring-like elastomeric seal or o-ring, for applications in which bubble free sealing is desired at the valve 114 and when utilizing fuels that may precipitate or otherwise source solid particles.

In the illustrated embodiment, the injector 200 further includes several additional fuel flow paths or channels that direct the fuel through various components of the injector 200 to allow the fuel to contact surfaces of these components and cool or otherwise transfer heat from these components to the fuel. More specifically, for cooling the force generator 106 (which may include multiple solenoid windings) in the illustrated embodiment, the injector 200 includes a first fuel cooling passage 202 coupled between the fuel conduit 136 and an inlet distributor 204 (e.g., an annular or ring-like distributor) at the force generator 106. The inlet distributor 204 disperses the fuel into the housing 109 around the force generator 106 through multiple inlet vents 206. The injector 200 also includes multiple outlet vents 208 to allow the fuel to exit the force generator 106 and collect at an outlet distributor or collector 210 (e.g., an annular or ring-like distributor). A second fuel cooling passage 212 extends from the outlet distributor 210 to fuel channel 214. As the valve 114 opens, the fuel can exit the injector 200 by passing from the fuel channel 214 to the fuel exit passage 103.

According to another feature of the illustrated embodiment, the injector 200 also includes additional fuel passages 216 extending radially outwardly to allow the fuel to pass between the force generator 106 and the driver 108. For example, these fuel passages 216 fluidly couple the fuel bore 150 in the driver cavity 118 with the housing 109 encompassing the force generator 106. As such, during operation the fuel can also pass radially outwardly and/or radially inwardly to transfer heat from the components of the injector 200, such as the force generator 106 and the driver 108, for example.

In certain embodiments, such as four stroke engine applications, the period during which fuel injection occurs typically ranges from about 30° to 120° of every other crank rotation of a complete cycle (e.g., 720°). Longitudinal fuel cavities 126 and 113 (FIG. 1) can accordingly provide for rapid cooling of the driver 108, particularly during the period ranging from approximately 30° to 120° of the crank rotation. As such, the driver 108 can serve as an internal heat sink to receive heat rejected from solenoid coil or force generator 106. Additional heat can also be rejected from the force generator 106 to fuel circulating through the various fuel distributors and passageways 204, 206, 208, and 216. Accordingly, during the 690° to 720° period of crank rotation when driver 108 and valve 114 are in the normally closed position, the force generator 106 can be provided with superior heat rejection capabilities to assure efficient rapid action and long life.

Such heat transfer from the components of the injectors 100, 200 can be beneficially added to the fuel that is delivered to the combustion chamber instead of being lost to the environment. Similarly, energy harvesting by thermoelectric, photovoltaic, vibrational and pressure piezoelectric generators is facilitated by such heat transfer to fuel passing through these injector embodiments with such heat sinking capabilities. Such heat transfer is also beneficial for long life, minimization of friction, and rapid operation to adequately cool the force generator 106 and driver 108. Transferring heat to the fuel that flows through the force generator 106 components and related features allows low cost modular component assemblies including the force generator 106 to be incorporated within thermally insulating glass or polymers.

Figure 3A:
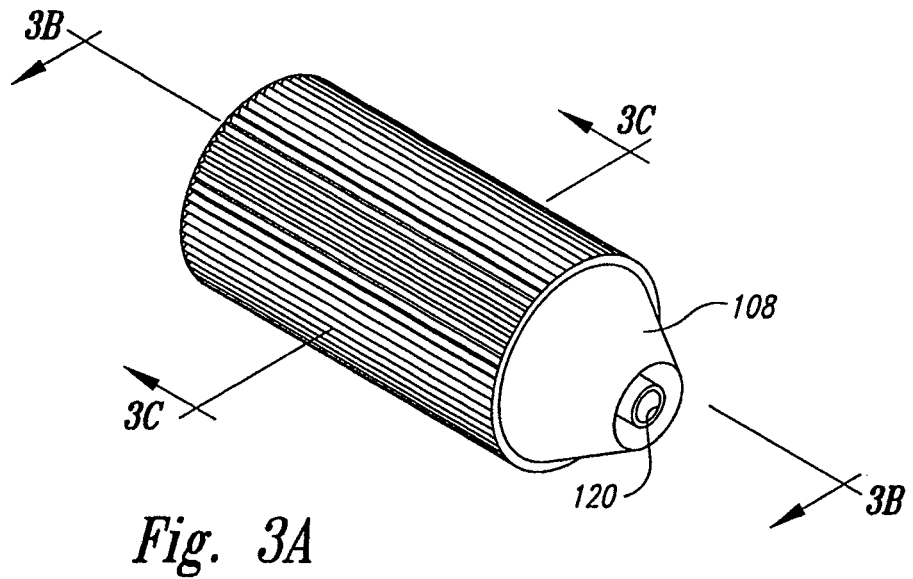
FIG. 3A is an isometric view of a component of the injector of FIGS. 1B and 2.
Figure 3B:
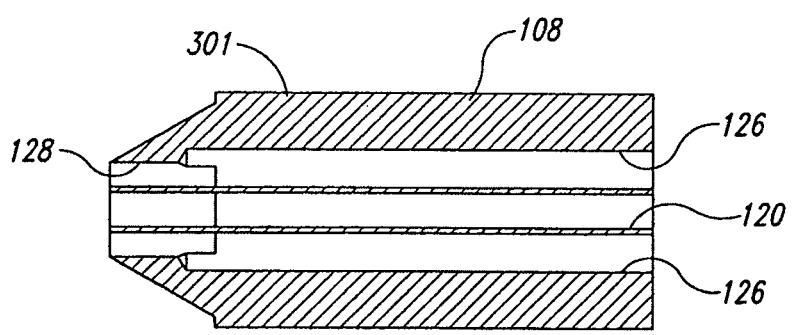
FIG. 3B is a cross-sectional side view taken substantially along the lines 3B-3B of FIG. 3A.
Figure 3C:
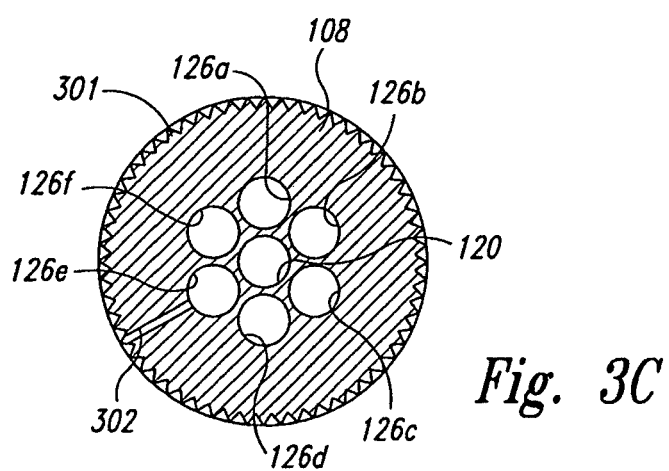
FIG. 3C is cross-sectional side view taken substantially along the lines 3C-3C of FIG. 3A.

FIG. 3A is an isometric view of the driver 108, FIG. 3B is a cross-sectional side view taken substantially along the lines 3B-3B of FIG. 3A, and FIG. 3C is cross-sectional side view taken substantially along the lines 3C-3C of FIG. 3A illustrating several of the features of the driver 108. Referring to FIGS. 3A-3C together, the driver 108 includes a body 301 with the actuator opening 120 extending centrally and longitudinally therethrough. The actuator opening 120 is configured to movably receive the actuator 112 of FIG. 1B. The body 301 also includes the initial fuel channel 128 that is fluidly coupled to one or more fuel cavities 126 (e.g., first-sixth fuel cavities 126a-126f illustrated in FIG. 3C) spaced radially apart from the actuator opening 120. The fuel cavities 126 extending longitudinally through the driver 108 to allow fuel to flow therethrough while contacting the body 301. Although the driver 108 includes six fuel cavities 126 that are symmetrically spaced apart in the illustrated embodiment, in other embodiments the driver can have more or less fuel cavities 126 that are positioned in symmetrical or nonsymmetrical distribution patterns. An exterior surface of the body 301 also includes multiple ridges 304 (FIG. 3C) to allow the fuel to flow around the driver 108 within the driver cavity 118 (FIG. 1B).

According to yet another feature of the illustrated embodiment, the body 301 of the driver 108 includes a slot or slit 302 extending radially outwardly from one of the fuel cavities 128. In certain embodiments, the slit 302 can be a generally straight slit or slot that extends radially outwardly from the actuator opening 120. In other embodiments, however, the slit 302 can have a generally curved or spiral shape. The slit 302 is configured to be a material discontinuity in at least a portion of the body 301 of the driver 108 to prevent eddy currents from forming in the driver 108 during operation. Such eddy currents can also be prevented by forming the driver 108 from a ferromagnetic alloy with a high electrical resistance.

Figure 4:
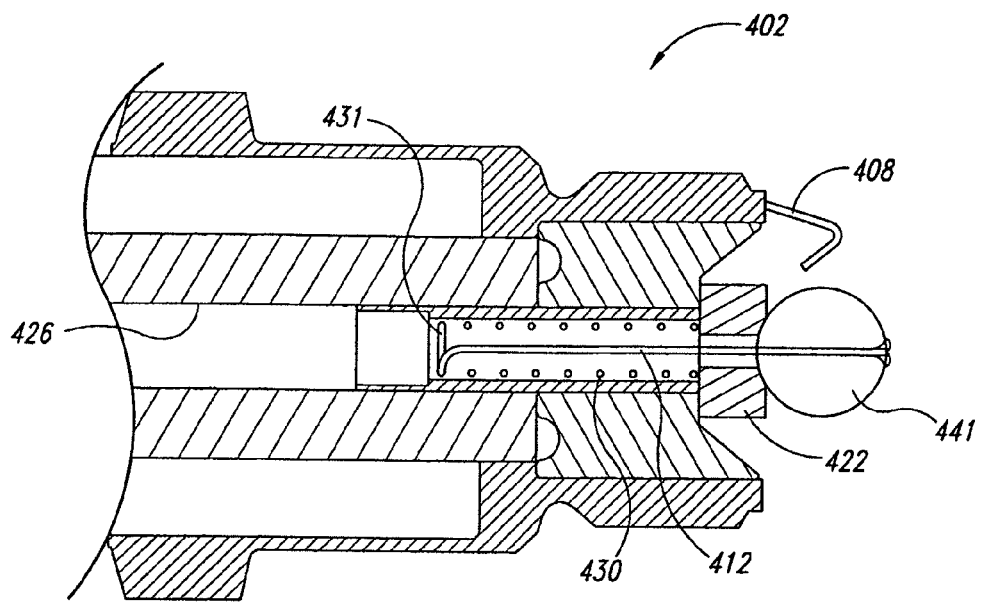
FIG. 4 is a cross-sectional side partial view of a nozzle portion of an injector configured in accordance with another embodiment of the disclosure.

FIG. 4 is a cross-sectional side partial view of a nozzle portion 402 of an injector configured in accordance with another embodiment of the disclosure. The nozzle portion 402 includes several features that are generally similar in structure and function to the corresponding features of the injectors described above. As described in detail below, however, the nozzle portion 402 is configured to actuate or otherwise inject fuel into a combustion chamber when a predetermined or desired pressure gradient to the combustion chamber is reached. Such a pressure gradient can be referred to, for example, as a cracking pressure that is sufficient to open the flow valve that is normally biased towards a closed position. In the illustrated embodiment, for example, the nozzle portion 402 includes an outwardly opening flow valve 441 that contacts a valve seat 422 when the flow valve 441 is in the closed position. The valve 441 is coupled to an actuator 412 (e.g., a cable, rod, etc.) extending into a fuel passageway 426. The actuator 412 includes an end portion or stop 431 that engages a biasing member 430 (e.g., a compression spring). In the illustrated embodiment, the stop 431 is an integral portion of the actuator 412, such as a deformed end portion. In other embodiments, however, the stop 431 can be a separate piece that is attached to the actuator 412. The biasing member 430 contacts the stop 431 and tensions the actuator 412 to retain the valve 441 in the closed position contacting the valve seat 422.

During operation, as the pressure of the fuel in the fuel passageway 426 increases to the predetermined cracking pressure, the pressure exerted against the valve 441 overcomes the force of the biasing member 430 to thereby open the flow valve 441 and inject the fuel into the combustion chamber. After the nozzle portion 402 injects the fuel and the pressure drops in the fuel passageway 426, the biasing member 430 provides a sufficient closing force by urging the flow valve 441 to the closed position via the stop 431 on the actuator 412. In certain embodiments, the actuation of the flow valve 441 described above can be controlled solely by controlling the pressure of the fuel in the nozzle portion 402. In other embodiments, however, the nozzle portion 402 can control the actuation of the flow valve 441 via the fuel pressure in combination with one or more other drivers or force generators (e.g., magnets, permanent magnets, electromagnetic solenoids, piezoelectric generators, etc.) The desired cracking pressures can be adaptively selected according to monitored combustion chamber properties and fuel characteristics. Moreover, the flow valve 441 and/or the actuator 412 can house one or more optical fibers or other monitoring components to monitor these properties in the combustion chamber.

According to another feature of the illustrated embodiment, the nozzle portion 402 includes an electrode 408 adjacent to the flow valve 441. As such, the electrode 408 and flow valve 441 are configured to produce an ignition event to combust the fuel that the nozzle portion 402 injects into the combustion chamber. In certain embodiments, the electrode 408 and/or the flow valve 441 can be coated or otherwise formed from materials that serve as combustion initiation catalysts to reduce or eliminate the ignition event energy required for combustion (e.g., spark or plasma energy) of the fuel entering the combustion chamber. A further alternative to such coatings is controlling the ionization of the injected fuel, as disclosed in a U.S. patent application titled SHAPING A FUEL CHARGE IN A COMBUSTION CHAMBER WITH MULTIPLE DRIVERS AND/OR IONIZATION CONTROL (U.S. Pat. No. 8,365,700), and incorporated herein by reference in its entirety.

Figure 5A:
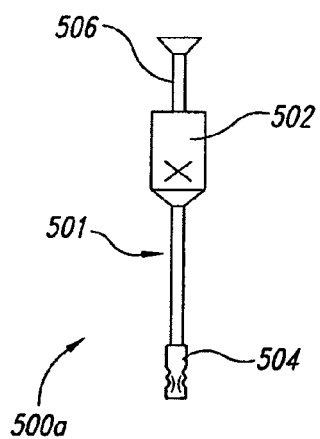
FIGS. 5A and 5B are schematic illustrations of valve and nozzle assemblies configured in accordance with further embodiments of the disclosure.
Figure 5B:
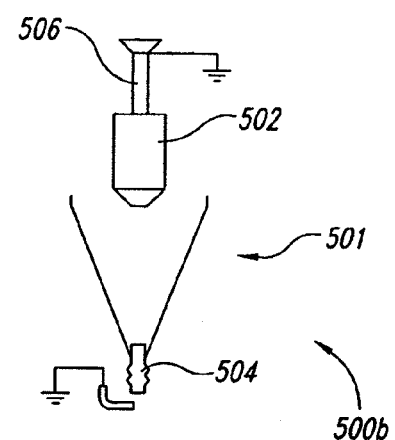

FIGS. 5A and 5B are schematic illustrations of valve and nozzle assemblies configured in accordance with further embodiments of the disclosure. More specifically, FIG. 5A is a schematic illustration of a hydraulic circuit 500a illustrating a hydraulically actuated valve assembly 501. In the illustrated embodiment, the valve assembly 501 includes a valve 502 that is coupled to each of a hydraulic actuator 506 and a nozzle end portion or tip 504. The actuator 506 can accordingly hydraulically move, activate, or otherwise open the valve 502 to allow fuel to flow past the valve 502 and exit the nozzle tip 504 into a combustion chamber. FIG. 5B is a schematic illustration of an electrical circuit 500b for electrically or electromagnetically actuating the valve 502. In the illustrated embodiment, the valve assembly 501 also includes the valve 502 that is coupled to each of an electric or electromagnetic actuator 506 and a nozzle 504. The actuator 506 can include an electromagnetic solenoid or piezoelectric operated assembly that can accordingly electrically actuate the valve 502 to open or otherwise move the valve 502 to allow the fuel to flow through the nozzle tip 504 into the combustion chamber. According to a further feature of the embodiment illustrated in FIG. 5B, the nozzle tip 504 can be made of a conductive material and also be coupled to an energy source, such as a high voltage source, to generate an ignition event with corresponding grounded ignition features 508. As such, spark voltage can be delivered to the nozzle tip 504 to generate an ignition event.

Figure 6A:
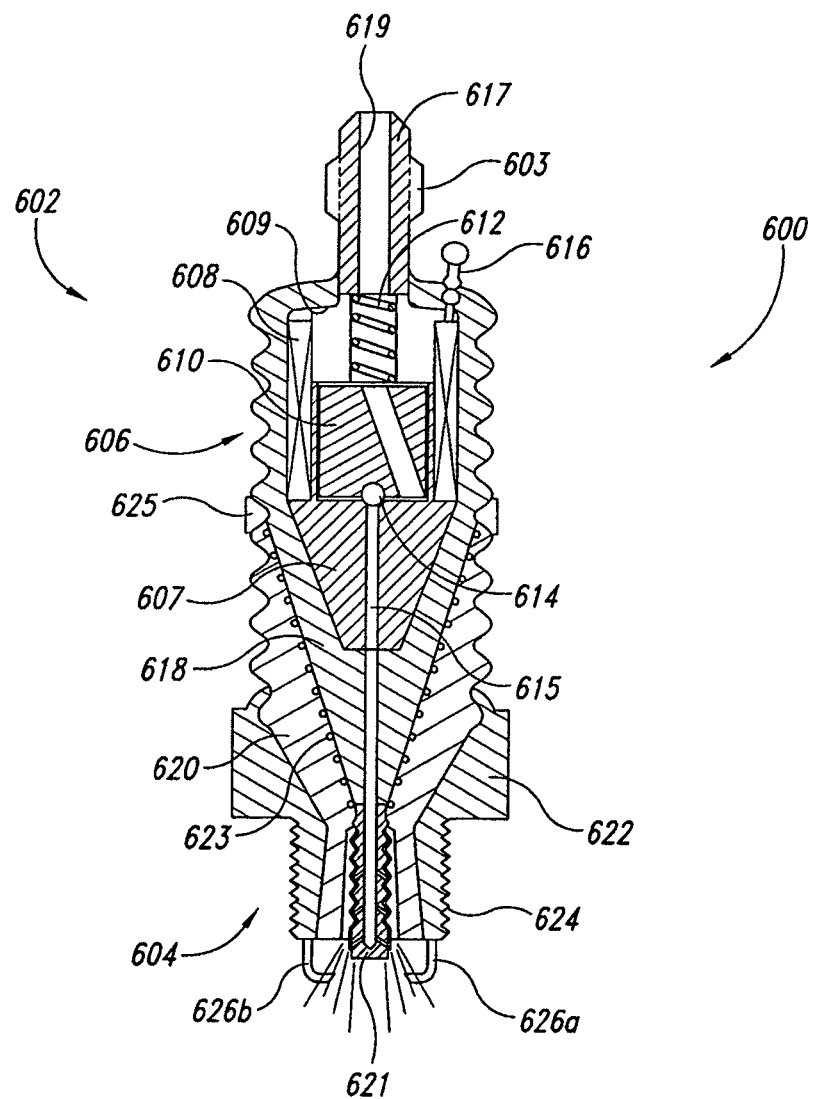

FIG. 6A is a cross-sectional side view of an injector 600 and FIG. 6B is partially exploded cross-sectional side view of the injector 600 configured in accordance with another embodiment of the disclosure, which can include several of the features illustrated in the schematic circuits of FIGS. 5A and 5B, as well as the features of the other combined injectors and igniters disclosed herein. Referring to FIGS. 6A and 6B together, the injector 600 includes a base portion 602 opposite a nozzle end portion 604. The base portion 602 carries an actuator assembly 606 including a plunger or driver 610 positioned in an actuator cavity 609 of an actuator body 607. The actuator assembly 606 further includes a force generator 608 surrounding the driver 610 and a corresponding flow valve 614 in the actuator cavity 609 (FIG. 6A). The force generator 608 can be a solenoid (e.g., electromagnetic or piezoelectric) or other suitable winding that can be coupled to an energy source via coupling 616. A biasing member 612 urges the driver 610 and corresponding flow valve 614 towards the nozzle portion 604 in a normally closed position. The force generator 608 can accordingly induce movement of the driver 610 away from the nozzle portion 604 to at least partially compress the biasing member 612 and move the flow valve 614 to an open position an allow fuel to flow through a fuel passageway 615.

The base portion 602 also includes an extension 617 having an introductory fuel passage 619 (FIG. 6A) therein that introduces fuel into the actuator cavity 609. A pressure coupling 603 can be attached to the extension 617 to further adjust the pressure of the fuel that flows into the injector 600.

In the illustrated embodiment the injector 600 includes a first insulator 618 and a second insulator 620 that surround various components of the injector 600. More specifically, the driver 610 is at least partially positioned (e.g., molded) in the first insulator 618. The first insulator 618 and/or the second insulator 620 can be made from any suitable insulating material including, for example, a glass, glass-ceramic, tetrafluoroethylene-hexafluoropropylene-vinylidene (THV), polyamideimide (PAI), polyetheretherkeytone (PEEK) or polyetherimide (PEI) insulator. In still further embodiments, these insulators can be transparent insulating bodies to accommodate embedded photo-optical instrumentation that receives and/or analyzes radiation emitted from the combustion chamber. Moreover, these insulators, as well as other insulative components of the injectors disclosed herein, can include the materials and/or be formed from the processes disclosed in U.S. patent application titled CERAMIC INSULATOR AND METHODS OF USE AND MANUFACTURE THEREOF (U.S. Pat. No. 8,192,852), and incorporated herein by reference in its entirety.

FIG. 6C is a cross-sectional side view illustrating several features of the first insulator 618. Referring to FIG. 6C, the first insulator 618 includes a base or first end portion 651 opposite a nozzle or second end portion 653. The first end portion 651 includes an actuator cavity 650 having a generally conical end portion 652 that is configured to receive the driver 610 (FIG. 6A). The first insulator 618 also includes a valve seat 654 that is configured to contact the valve 614 (FIG. 6A) when the valve 614 is in the closed position to interrupt fuel flow. A fuel channel 656 extends longitudinally through the first insulator 618 from the actuator cavity 650 through the second end portion 653. As also explained in detail below, the second end portion 653 is configured to be coupled to an electrically conductive nozzle tip portion of the injector 600.

According to another feature of the illustrated embodiment, the exterior surface of the first insulator 618 includes multiple ribs 658 extending circumferentially around the first end portion 651. Moreover, the exterior surface of the second end portion 653 is generally smooth or planar and extends having a generally conical or frustoconical shape. As described in detail below, the second end portion 653 of the first insulator 618 is configured to mate or otherwise fit in a corresponding cavity in the second insulator 620. Moreover, a conductive coil 623 (FIGS. 6A and 6B), such as a transformer coil, can be wound around the exterior surface of the second end portion 653 of the first insulator 618 and thereby be positioned between the first insulator 618 and the second insulator 620 in the assembled state.

FIG. 6D is a cross-sectional side view of the second insulator 620. The second insulator 620 includes a base or first end portion 661 opposite a nozzle or second end portion 663. The first end portion 661 includes a first cavity portion 660 having a generally conical shape tapering narrowly towards the second end portion 663 (e.g., a cross-sectional dimension of the first cavity portion 660 gets smaller towards the second end portion 663). The first cavity portion 660 is configured to receive the tapered second end portion 653 of the first insulator 618. The second end portion 663 of the second insulator 620 includes a second cavity portion 662 opposite and extending from the first cavity portion 660. The second cavity portion 662 also has a generally conical shape, however the second cavity portion 660 tapers narrowly towards the base portion 661 (e.g., a cross-section dimension of the second cavity 662 that gets larger towards the second end portion 663, thereby tapering in an opposite direction of the first cavity portion 660). The second cavity portion 662 is configured to at least partially surround an electrically conductive injection tip of the injector 600, as described in detail below.

According to another feature of the illustrated embodiment, the exterior surface of the first end portion 661 of the second insulator 620 includes multiple ribs 664 extending circumferentially around the first end portion 661. These ribs 664 are configured to match or otherwise be generally aligned with the ribs 658 of the first insulator 618 (FIG. 6C).

Figure 6E:
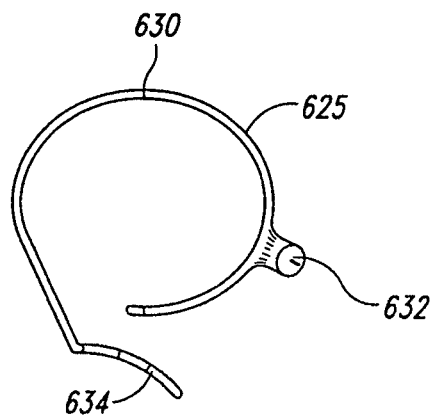
FIG. 6E is a top plan view and FIG. 6F is a side view of a conductive clamp assembly of the injector of FIGS. 6A and 6B.
Figure 6F:
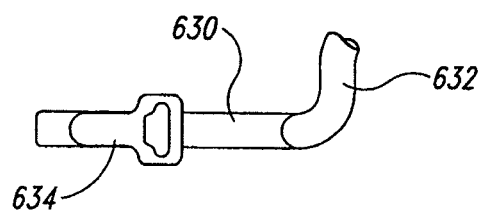

Referring again to FIGS. 6A and 6B, the injector 600 includes an electrically conductive injection end portion or nozzle injection tip 621. The injection tip 621 can be a metallic member that is carried by the first insulator 618 and/or second insulator 620 and configured to be positioned at a combustion chamber interface. As described in detail below, the injection tip 621 is configured to selectively inject fuel, alone or in combination with the other fuel metering components of the injector 600. Moreover, the injection tip 621 is coupled to an energy source, such as a high voltage source. More specifically, the injector 600 includes a conductive band 625 (e.g., a metallic band) extending circumferentially around the interface between the first insulator 618 and the second insulator 620. The conductive band 625 can be coupled to a voltage source via a conductor or spark lead as described below with reference to FIGS. 6E and 6F. For example, FIG. 6E is a top plan view and FIG. 6F is a side view of a conductive clamp assembly 630 including the conductive band 625 coupled to a spark or voltage lead 632. The clamp assembly 630 also includes a releasable locking member 634 to facilitate attachment and removal of the conductive band 625 on the injector 600. The clamp assembly 630 can accordingly removably couple the conductive band 625 and the voltage lead 632 to the injector 600 of FIGS. 6A and 6B. More specifically, and referring to FIGS. 6A, 6B, 6E, and 6F together, the clamp assembly 630 can be attached to a mid-portion of the injector 600 at an interface between the first insulator 618 and the second insulator 620 to conductively couple the voltage lead 632 to the spiral wound conductor 623 via the conductive band 625.

As such, the conductive band 625 is coupled to the injection tip 621 via the conductor 623, which can be an aluminum or copper wire extending along the second end portion 653 of the first insulator 618 to the injection tip 621. In the illustrated embodiment, for example, the conductor 623 is spirally wound around the second end portion 653 of the first insulator 618 and positioned between the first insulator 618 and the second insulator 620. Spark voltage can accordingly be delivered to the injection tip 621 from a suitable high voltage source.

Referring again to FIGS. 6A and 6B, the nozzle portion 604 further includes a combustion chamber member or seal 622 coupled to the second insulator 620. The combustion chamber seal 622 can be a metallic member that is configured to threadably engage a port in an engine head with multiple threads 624. The seal 622 also carries corresponding ignition electrodes or features 626 (identified individually as a first ignition feature 626a and a second ignition feature 626b). Although only two ignition features 626 are shown in the illustrated embodiment, in other embodiments the seal 622 can carry multiple ignition features suitable to provide the spark erosion life desired for any specific application. In certain embodiments, the ignition features 626 can be made from materials such as a Kanthal alloy that provides for resistance heated, catalytic, and/or spark ignition at startup but thereafter remains sufficiently hot throughout the operational cycle to provide ignition with very low or no electrical energy expenditure. This form of heat harvesting for ignition by taking heat from the combustion process can be advantageous for purposes of minimizing the system weight, cost, and failure tendency, while also improving the overall operating efficiency by avoiding the losses, such as losses that can be attributed to the engine-cycle (55 to 75% loss), the alternator (10 to 30% loss), the battery (10 to 40% loss), and the ignition circuit and coil (10 to 40% loss).

Figure 6G:
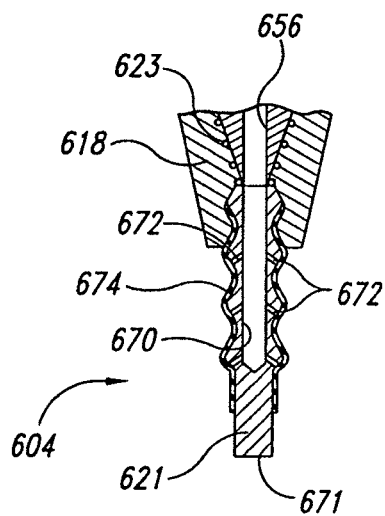
FIG. 6G is a partial cross-sectional side view of a nozzle portion of the injector of FIGS. 6A and 6B.

In certain embodiments of the disclosure, the cracking pressure required to open a flow valve to selectively deliver fuel into the combustion chamber can be controlled by the various configurations of the force generators, drivers, actuators, flow valves, etc. disclosed herein. In the embodiment illustrated in FIGS. 6A and 6B, however, the injection tip 621 also includes several fuel metering features that can also help to prevent injecting fuel into the combustion chamber at unintended times. For example, FIG. 6G is a partial cross-sectional side view of the nozzle portion 604 of the injector 600. As shown in FIG. 6G, the injection tip 621 is coupled to the lead wire or conductor 623, which is sealed between the first insulator 618 and the second insulator 620 (not shown in FIG. 6G) and coupled to a voltage source.

As shown in FIG. 6G, the injection tip 621 includes a fuel cavity 670 extending partially longitudinally therethrough. The fuel cavity 670 is fluidly coupled to the fuel channel 656 of the first insulator 618 to introduce fuel into the injection tip 621. In the illustrated embodiment, however, the fuel cavity 670 does not exit the injection tip 621 at a distal end portion 671 of the injection tip 621 (e.g., the fuel cavity 670 can be a blind hole extending partially through the injection tip 621). Rather, the injection tip includes multiple fuel exit or delivery passageways 672 that are coupled to the fuel cavity 670. In the illustrated embodiment the individual fuel delivery passageways 672 extend from the fuel cavity 670 at an inclined angle with reference to a longitudinal axis of the injection tip 621. The injection tip 621 is further at least partially covered with a sleeve 674, such a deformable or an elastomeric sleeve 674, that seals each of the fuel delivery passageways 672 below a predetermined pressure, such as a predetermined cracking pressure. The sleeve 674 is anchored by the first insulator 618 against axial displacement and confined to the diametrical space within the second insulator 620 (FIG. 6A). When the predetermined pressure is reached, the elastomeric sleeve 674 can deform or expand to allow fuel to exit from the fuel cavity 670 in the injection tip 621 via the fuel delivery passageways 672. Accordingly, the elastomeric sleeve 674 provides additional fuel metering features that can be controlled by the pressure of the fuel in the injector 600, and thereby prevent fuel from inadvertently passing into the combustion chamber between intended combustion events.

The sleeve 674 can be made from several different suitable polymers, as reflected in Table 1 below. For example, the sleeve 674 may be made from numerous suitable polymers including popular elastomers because the fuel that passes intimately along the inside of the sleeve 674 it cool and viable as a long-life elastomeric material. Extremely long life and rugged heat resistant embodiments of the sleeve 674 can be made by weaving a hollow tube of PBO or Kapton fibers over a more elastomeric film tube of Viton, fluorosilicone, PEN, Aramid and/or Kapton. Additional protection may be provided by coating the assembly with one or more thin layers of reflective aluminum or chromium.

TABLE 1

SELECTED POLYMER CHARACTERISTICS

| Film Characteristic | PBO | KAPTON | ARAMID | PEN |
|---|---|---|---|---|
| Melt Temperature ° C. | None | None | None | 272 |
| Glass Transition ° C. | None | 350 | 280 | 113 |
| Young's Modulus Kg/mm$^2$ | 4900 | 300 | 1000-2000 | 650-1400 |
| Tensile Strength Kg/mm$^2$ | 56-63 | 18 | 50 | 30 |
| Tensile Elongation % | 1-2 | 70 | 60 | 95 |
| Long Term Heat Stability | >300 | 230 | 180 | 155 |
| Thermal Exp. ppm/° C. | −2 | 20 | 15 | 13 |
| Moisture Absorption % | 0.8 | 2.9 | 1.5 | 0.4 |

Figure 7A:
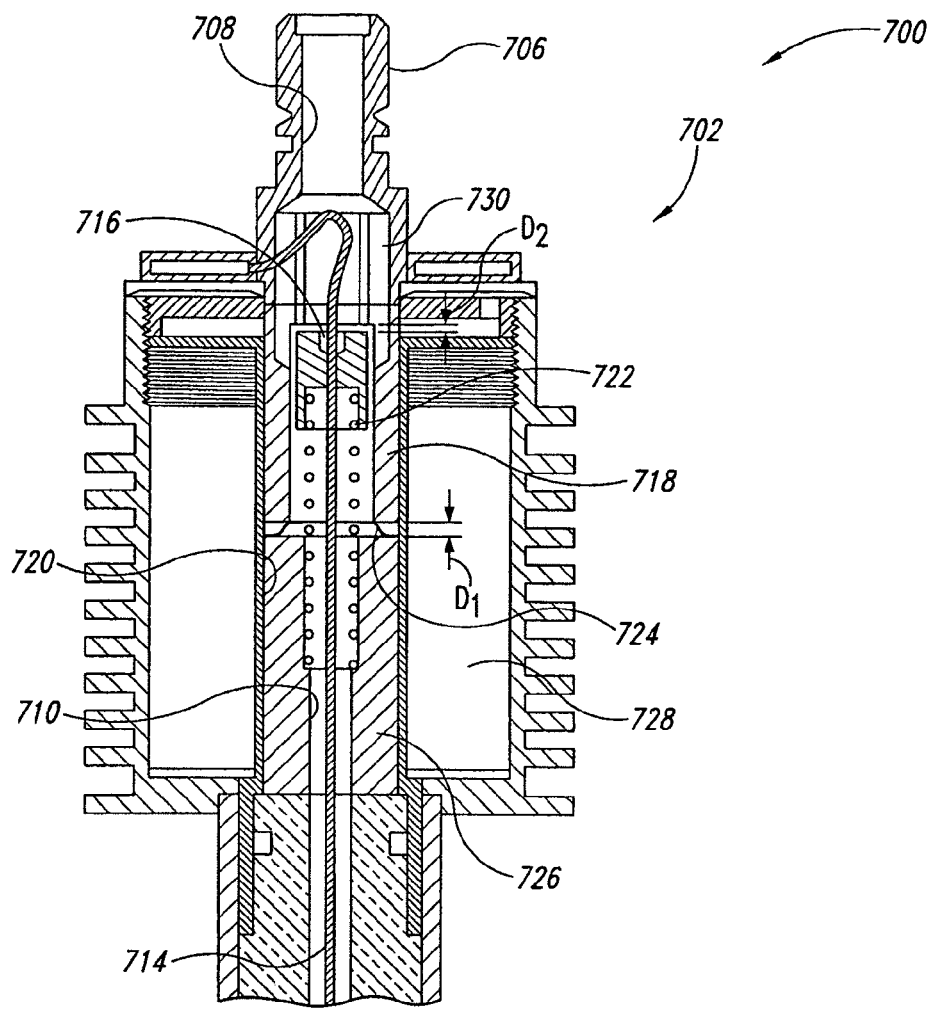
FIG. 7A is a cross-sectional side view of an injector configured in accordance with yet another embodiment of the disclosure.
Figure 7A:
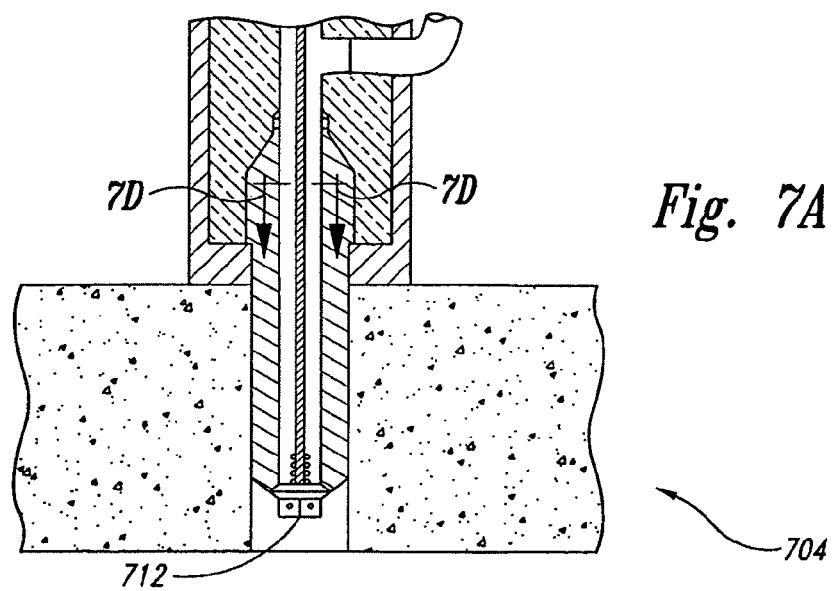

PBO = Polybenzoxazole
Kapton = Poly(4,4'-oxydiphenylene-pyromellitimide)
Aramid = poly-metaphenylene isophtalamides (MPIA)
PEN = Polyethylene Naphthalate FIG. 7A is a cross-sectional side view of an injector 700 configured in accordance with another embodiment of the disclosure. The injector 700 illustrated in FIG. 7A includes several features that are generally similar in structure and function to the corresponding features of the injectors described herein and in the patents and patent applications incorporated herein by reference. As such, several features of the injector 700 that have been described above may not be described with reference to FIG. 7A. In the illustrated embodiment, the injector 700 includes a first or base portion 702 opposite a second or nozzle portion 704. The base portion 702 includes a pressure fitting 706 configured to be coupled to a fuel source, such as a pressurized fuel source, to introduce fuel into an initial fuel chamber or channel 708. Fuel travels from the initial fuel channel 708 through the base portion 702 to a fuel passageway 710 extending longitudinally though the injector 700 to the nozzle portion 704. An outwardly opening flow valve 712 is positioned at the nozzle portion 704 to meter or otherwise control the flow of the fuel from the fuel passageway 710 out of the nozzle portion 704. For example, the flow valve 712 can be seated against a valve seat to block or close the fuel flow, and the flow valve 712 can move away from the valve seat to inject fuel into a combustion chamber. A cable assembly or actuator 714 is operably coupled to the flow valve 712 to move the flow valve 712. The actuator 714 can be a stiffened rod or similar device that can house one or more optically monitoring features as described in detail above. The actuator 714 can also be coupled to a computer or other processing device for control of the injector 700.

In the illustrated embodiment, an actuator tensioner or actuator stop 716 is attached or otherwise coupled to the actuator 714 at the base portion 702 of the injector 700. The stop 716 is configured to contact a plunger or driver 718 so that the driver 718 can move the actuator 714 to in turn open or close the flow valve 712. The driver 718 can be made of a ferromagnetic material and is configured to be mechanically, electromechanically, and/or magnetically actuated to move the actuator 714. More specifically, the driver 718 is positioned in a driver cavity 720 in the base portion 702. A first contact surface of the driver 718 is spaced apart from an electromagnetic pole piece 726 by a first distance $D_1$, and a second contact surface of the driver 718 is spaced apart from the actuator stop 716 by a second distance $D_2$ that is less than the first distance $D_1$.

A force generator 720, such as a solenoid winding, surrounds the driver 718 in the driver cavity 720. Moreover, the driver 718 is also positioned proximate to a first biasing member 722, a second biasing member 724, and the electromagnetic pole piece 726 in the driver cavity 720. The first biasing member 722 can be a compression spring that is coaxially positioned around the actuator 714 and that contacts the actuator stop 716 and the pole piece 726. As such, the first biasing member 722 urges the actuator stop 716 away from the pole piece 726 (e.g., towards the base portion) to tension the actuator 714 to retain the flow valve 712 in a normally closed position. The second biasing member 724 is positioned between the driver 718 and the pole piece 726. In the illustrated embodiment, the second biasing member 724 is a disk spring and the pole piece 726 can be an electromagnetic pole that attracts the driver 718. The second biasing member 724 can be made from a non-magnetic material, such as a non-magnetic alloy. As such, the second biasing member 724 can act as a compression spring to urge the driver 718 away from the pole piece 726. The second biasing member 724 also provides a sufficient non-magnetic gap between the driver 718 and the pole piece 726 to prevent the driver 718 from sticking to the pole piece 726. In the illustrated embodiment, the base portion 702 further includes a third biasing member or attractive element 730, such as a magnet, that attracts the driver 718 towards the base portion 702.

In operation, administering current or other energy to the force generator 728 opens the flow valve 712. More specifically, administering current to the force generator 728 forces the driver 718 towards the pole piece 726. As the driver 718 moves the distance $D_2$ towards the actuator tensioner or stop 716, the driver 718 gains momentum and associated kinetic energy before striking or contacting the actuator stop 716. Moving the actuator stop 716 towards the pole piece 726 by the first distance $D_1$ relaxes the tension in the actuator 714 to allow the flow valve 712 to open. As the driver 718 moves towards the pole piece 726, the driver 718 compresses the first biasing member 722 and the second biasing member 724. As such, the first biasing member 722, the second biasing member 724, and the attraction element 730 can urge the driver 718 towards the base portion 702 to allow the actuator stop 716 to tension the actuator 714 and close the flow valve 712. Moreover, when the driver 718 is pulsed towards the pole piece 726, energy can be applied in the force generator 728 to produce pulsed current according to a selected "hold" frequency to pulse or otherwise actuate the driver 718.

Figure 7B:
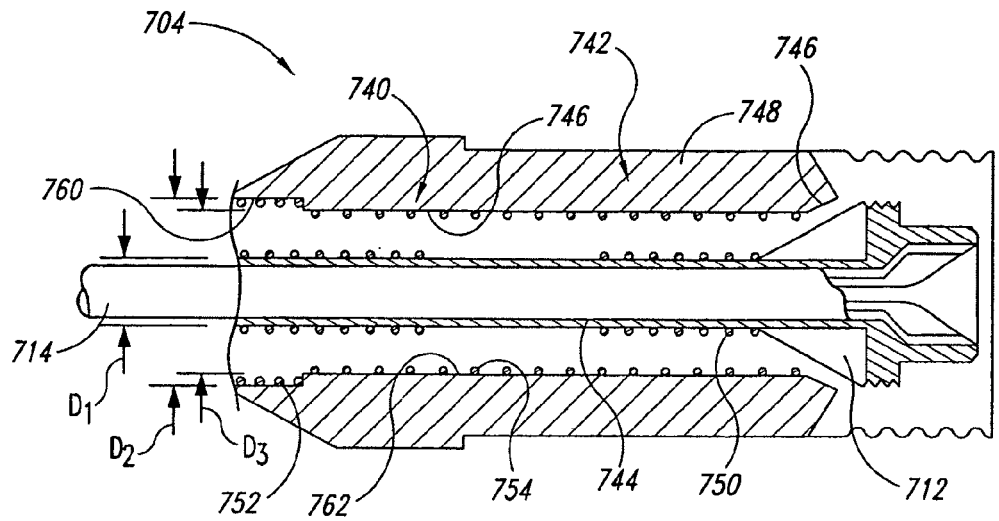
FIG. 7B is an enlarged cross-sectional side partial view of a valve assembly and FIG. 7C is a side view of a valve guide of the injector of FIG. 7A.
Figure 7C:
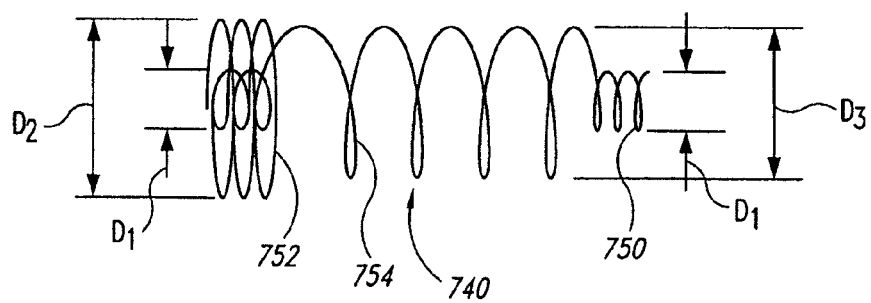

FIG. 7B is an enlarged cross-sectional side partial view of a valve assembly of the nozzle portion 704 of the injector 700 of FIG. 7A, and FIG. 7C is a side view of a valve guide 740 of the valve assembly 742. Referring to FIGS. 7B and 7C together, the nozzle portion 704 includes an insulator 748 having a fuel passageway or channel 746 extending longitudinally therethrough. The insulator 748 also includes a valve seat 746 that contacts the valve 712 when the valve 712 is in the closed position. In certain embodiments, the flow valve 712 can be made of any suitable material and include surface characterization having a precision polished metal surface or an insert made of Viton, THV, fluorosilicone or another suitable elastomer. The valve assembly 742 also includes a tubular valve support 744 extending coaxially through the fuel passageway 746 of the nozzle portion 704. The tubular valve support 744 is also coaxially aligned and coupled to an end portion of the actuator 714. The tubular valve support 744 further carries the valve 712 and accordingly couples the valve 712 to the actuator 714. The tubular valve support 744 moves longitudinally through the valve guide 740 to freely shuttle and support the valve 712 within the valve guide 740 as the valve 712 rapidly moves towards and away from the valve seat 746.

In the illustrated embodiment, the valve guide 740 is a spirally wound wire forming one or more spiral diameters corresponding to the inner diameter of the fuel passageway 746 at the nozzle portion 704. In the illustrated embodiment, for example, the valve guide 740 has a first portion 750 having a first diameter $D_1$ corresponding to an outer diameter of the tubular valve support 744, a second portion 752 having a second diameter $D_2$ greater than the first diameter $D_1$ corresponding to a first portion 760 of the fuel passageway 746, and a third portion 754 having a third diameter $D_3$ greater than the first diameter $D_1$ and less than the second diameter $D_2$ and corresponding to a second portion 762 of the fuel passageway 746. Portions of the valve guide 740 having the first diameter $D_1$ can be discrete segments of the valve guide 740 or otherwise be spaced apart from the other portions of the valve guide 740 having the second and/or third diameters $D_2$, $D_3$. As such, the first portion of the valve guide 740 with the first diameter $D_1$ supports the tubular support 746, the second portion of the valve guide 740 with the second diameter $D_2$ retains the valve guide 740 and/or prevents the valve guide 740 from moving longitudinally out of the nozzle portion 702, and the third portion of the valve guide 740 with the third diameter $D_3$ positions the valve guide 740 in the fuel passageway 746. In operation, the valve guide 740 supports and dampens the tubular valve support 744 as the tubular valve support 744 moves during rapid actuation of the flow valve 712.

In further embodiments of the disclosure, the injector 700 can include similar spirally wound support guides forming two or more different diameters for supporting other injector components. For example, a similar spirally wound support guide can support, align, and/or dampen the actuator 714 of FIG. 7A. In modern diesel engines, for instance, and particularly for large stationary engines, the distance of the actuator 714 between the driver 718 and the engine head may be approximately 12-24 inches or more.

Figure 7D:
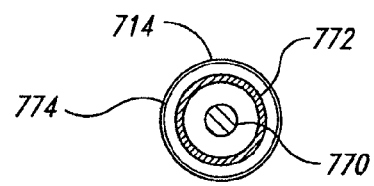
FIG. 7D is a cross-sectional side view taken substantially along the lines 7D-7D of FIG. 7A.

FIG. 7D is a cross-sectional side view of the actuator 714 taken substantially along the lines 7D-7D of FIG. 7A illustrating features of the actuator in embodiments where the actuator includes one or more optical fibers that link to a computer or processor to provide combustion chamber data (e.g., pressure, temperature, etc.). As shown in the embodiment illustrated in FIG. 7D, the actuator 714 can consist of a core of optical fibers 770, which may be surrounded by a layer of electrically conductive wires or fibers 772 to deliver ignition voltage to the conductive portions of the flow valve 712 (FIG. 7A-7C). The optical fibers 770 can be made from at least any of the following materials: sapphire, quartz, aluminum fluoride, and/or ZABLAN to convey combustion chamber properties. In certain embodiments, the individual fibers can have a cross-sectional dimension (e.g., a diameter) of at least approximately 5 μm, or less. Moreover, cooling by the fuel flowing by the actuator 714 enables these fibers to remain essentially inert to the environment. By way of example, sapphire has high internal transmittance from approximately 150 nm to 6000 nm in the range from the far UV to the middle infrared. Although the cooling derived from passing fuel prevents excessive heating of the fiber optics, sapphire nevertheless maintains its structural integrity up to approximately 1600 to 1700 degrees Celsius, and melts above approximately 2000 degrees Celsius. The actuator 714 can also include another layer of braided high strength fibers made of polyimide, such as Kevlar or other high strength fibers to surround the inner layers. The actuator 714 can further include a friction reducing outer sheath 774, which can be made of suitable friction reducing materials, such as PTFE of THV tubing, for example.

Figures 8A, 8B:
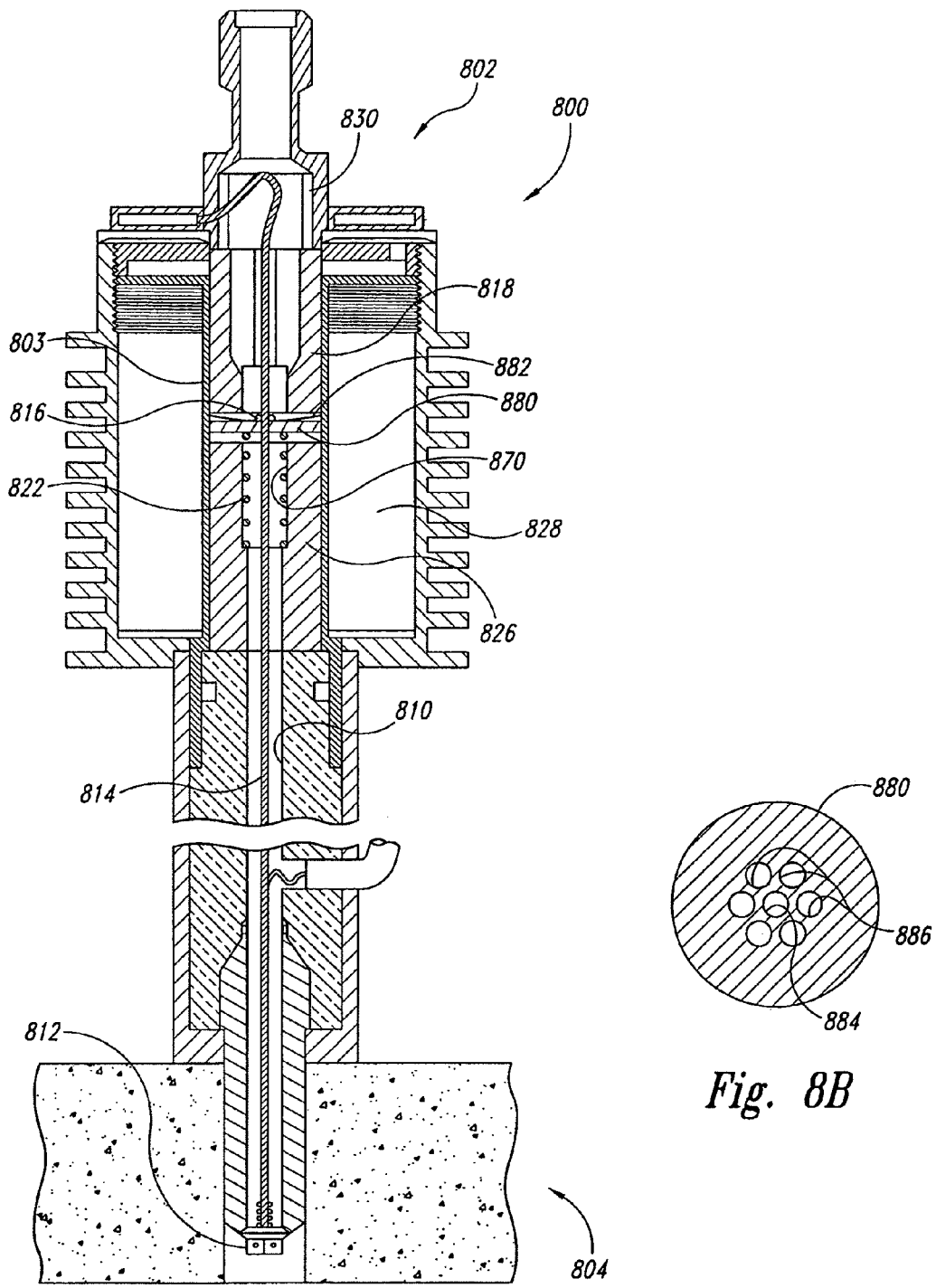
FIG. 8A is a cross-sectional side view of an injector configured in accordance with another embodiment of the disclosure.
FIG. 8B is a front plan view of an actuator tensioner of the injector of FIG. 8A.

FIG. 8A is a cross-sectional side view of an injector 800 configured in accordance with yet another embodiment of the disclosure. The embodiment illustrated in FIG. 8A includes several features that are generally similar in structure and function to the corresponding features of the fuel injectors described above. For example, the injector 800 includes a base portion 802 opposite a nozzle portion 804. At the base portion 802, the injector 800 includes a force generator 828 (e.g., a solenoid winding, piezoelectric, etc.) configured to activate or move a plunger or driver 818. The driver 818 can be a ferromagnetic or ferroelectric component 818 that moves in response to current flowing through the force generator 828. The base portion 802 further includes an electromagnetic pole piece 826, as well as a biasing member or attractive element 830, such as a magnet or permanent magnet that attracts the driver 818 towards the base portion 802 to a closed or stopped position. The pole piece 826 includes a fuel bore or cavity 870 aligned with a fuel passageway 810 extending longitudinally through the injector 800. An actuator 814 extends through the fuel cavity 870 and fuel passage way 810 and is coupled to an outwardly opening flow valve 812 at the nozzle portion 804.

In the illustrated embodiment in the base portion 802, the actuator 814 is coupled to an actuator or motion stop 816. The actuator 814 is also coupled to a valve tensioner or actuator tensioner 880 (e.g., the actuator 814 can be attached to the actuator tensioner 880 or movably received through a central opening in the actuator tensioner 880). The actuator tensioner 880 is configured to contact the motion stop 816 to tension the actuator 814 to retain the flow valve 812 in a closed position. More specifically, the actuator tensioner 880 is positioned between and spaced apart from each of the driver 818 and the pole piece 826. The stop 816 is positioned between the driver 818 and the actuator tensioner 880. A biasing member 822 (e.g., a coil or compression spring) urges the actuator tensioner 880 against the motion stop 816 towards the base portion 802 and away from the nozzle portion 804. As such, the biasing member 822 contacts the actuator tensioner 880 to tension the actuator 814 to retain the valve 812 in the closed position.

When the flow valve 812 is in the normally closed position and the biasing member 822 urges the actuator tensioner 880 against the motion stop 816, the actuator tensioner 880 is spaced apart from the driver 818 by a gap, and the actuator tensioner 880 is also spaced apart from the pole piece 826 by a gap. As such, the biasing member 822 preloads the actuator 814 by pressing the actuator tensioner 880 against the motion stop 816. To open the flow valve 812 during operation, a current is applied to the force generator 828 to move the driver 818 towards the actuator tensioner 880. Because the driver 818 is initially spaced apart from the actuator tensioner 880, the driver 818 is able to gain momentum and associated kinetic energy prior to contacting the actuator tensioner 880. As the driver 818 contacts the actuator tensioner 880, the driver 818 moves the actuator tensioner 880 towards the nozzle portion 804 to compress the biasing member 822. As the actuator tensioner 880 and corresponding motion stop 816 move towards the pole piece 826 and the actuator tensioner contacts the pole piece 826, the tension in the actuator 814 relaxes to rapidly open the flow valve 812 at pressures up to at least approximately 1500 atmospheres and to inject fuel into the combustion chamber. At the end of the desired fuel injection period, the solenoid current in the force generator 828 is stopped or momentarily reversed, and the biasing member 822 thrusts the actuator tensioner 880 back to the normally closed position spaced apart from each of the pole piece 826 and the driver 818. The driver 818 also moves to its normally closed position to be adjacent to the magnet 830 and spaced apart from the actuator tensioner 880.

In certain embodiments, it may be desirable to reduce the impact shock as the driver 818 strikes the actuator tensioner 880. In such embodiments, the injector 800 can include a biasing member or impact reducer 882 adjacent to the actuator tensioner 880 and facing the driver 818. The impact reducer 882 can be, for example, a caged urethane disk spring, or one or more Bellville washers or coned-disk springs. Moreover, in this instance it is possible to further reduce the shock by providing a diametrical step down or diameter reduction of the cylindrical bearing 803 that houses the driver 818 and the actuator tensioner 880. More specifically, the bearing 803 can have a first diameter in the zone where actuator tensioner 880 travels, and a second smaller inside diameter in the zone where the driver 818 travels. Therefore, as the actuator tensioner 880 is thrust against the diametrical stop, the impact reducer 882 provides a reduced acceleration of the actuator 814 to the equilibrium position for normally closed dwell time between fuel injection cycles.

FIG. 8B is a front plan view of the actuator tensioner 880 of FIG. 8A. As shown in the embodiment illustrated in FIG. 8B, the actuator tensioner 880 can have a disc-like configuration including a central actuator opening 884 extending therethrough that movably receives the actuator 814. The actuator tensioner 880 also includes several fuel openings 886 that are configured to allow the fuel to flow through the actuator tensioner 880. Although the illustrated embodiment includes six fuel openings 886 spaced equally apart and radiating from the actuator opening 884, in other embodiments the actuator tensioner 880 can include greater than or less than six fuel openings 886 arranged in symmetrical or nonsymmetrical patterns.

Figures 9A, 9B:
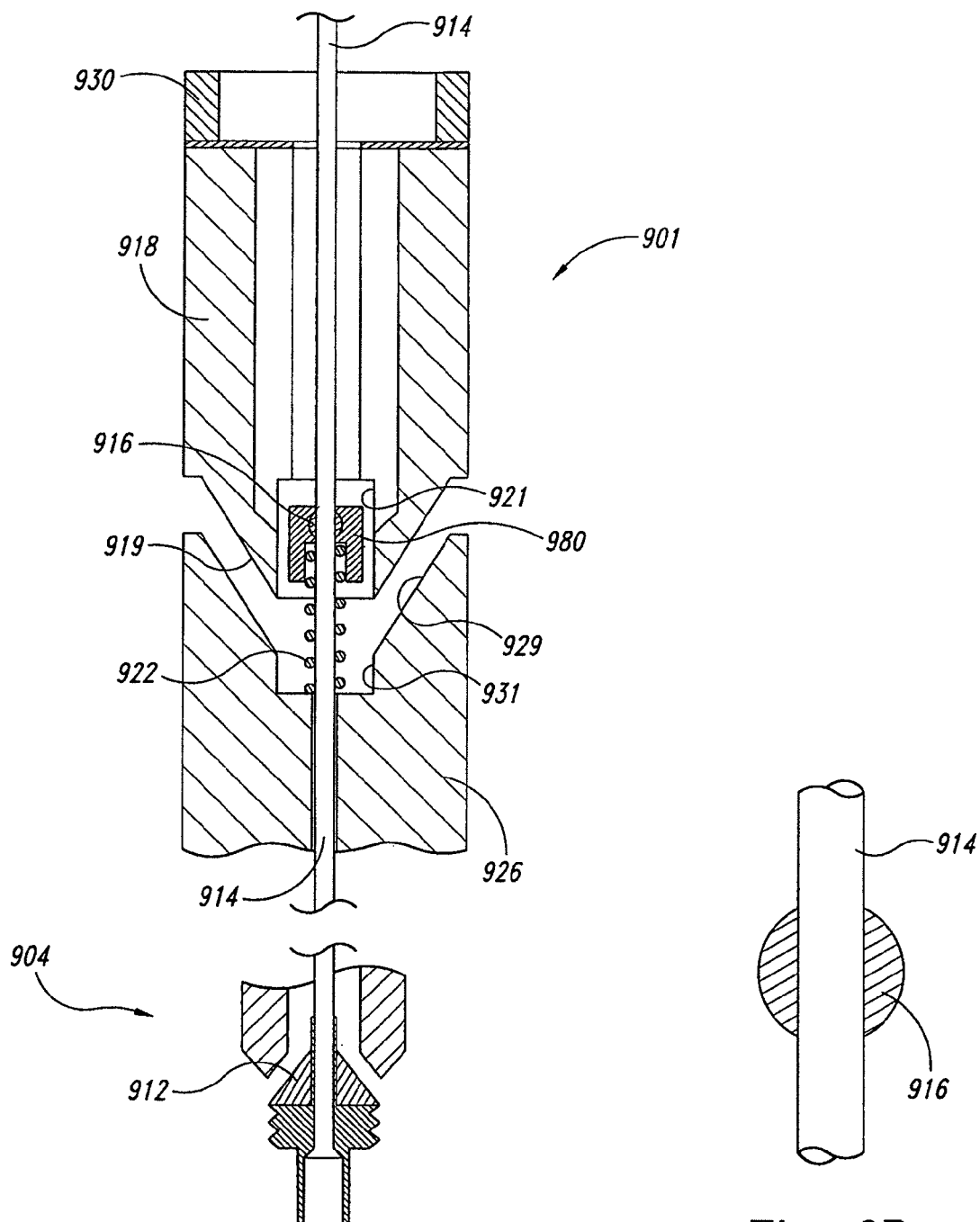
FIG. 9A is a cross-sectional side partial view of a valve actuating assembly for, an injector configured in accordance with another embodiment of the disclosure.
FIG. 9B is an enlarged detail view of a portion of the assembly of FIG. 9A.

FIG. 9A is a cross-sectional side partial view of a valve actuating assembly for an injector configured in accordance with another embodiment of the disclosure and particularly suited to achieve superior control and adaptability for high pressure fuels. FIG. 9B is an enlarged detail view of a portion of the assembly of FIG. 9A. Referring to FIGS. 9A and 9B together, the assembly 901 includes several features that are generally similar in structure and function to the corresponding features of the injector 800 described above with reference to FIGS. 8A and 8B, as well as to the other injectors disclosed herein. For example, in the illustrated embodiment the assembly 901 includes an actuator 914 operably coupled to a flow valve 912 at a nozzle portion 904 of an injector. The actuator 914 is also coupled to an actuator stop 916, which in turn contacts an actuator tensioner 980. As shown in FIG. 9B, the actuator stop 916 can be an enlarged portion attached or integrally formed with the actuator 914 having a larger cross-sectional dimension than a corresponding cross-sectional dimension of the actuator 914. A biasing member 922, such as a compression spring, urges the actuator tensioner 980 against the motion stop 916 and away from a pole piece 926 to tension the actuator 914 and close the flow valve 912 or otherwise retain the flow valve 912 in a closed position. The assembly 901 further includes a driver 918 that can be driven by a force generator (not shown). The driver 918 is spaced apart from the actuator tensioner 980 and positioned adjacent to a biasing member 930, such as a magnet when the driver 918 is not activated and the flow valve 912 is in a closed position. As such, the actuator tensioner 980 is spaced apart from each of the driver 918 and the pole piece 926 when the valve 912 is in a closed position.

According to further features of the illustrated embodiment, the actuator tensioner 980 has a generally cylindrical shape that is configured to fit within each of the driver 918 and the pole piece 926 during actuation of the assembly 901. More specifically, the driver 918 includes an end portion 919 having a generally tapered, conical, or frustoconical shape that is at least partially received within a corresponding tapered, conical, or frustoconical opening in an end portion 929 of the pole piece 926. The driver 918 further includes a generally cylindrical cavity 921 in the end portion 919. The cylindrical cavity 921 is sized to receive the actuator tensioner 980 during actuation. Moreover, the end portion 929 of the pole piece 926 also includes a generally cylindrical cavity 931 that is configured to receive the actuator tensioner 980. As such, during operation to open the outwardly opening flow valve 912, the driver 918 is actuated to gain momentum prior to striking the actuator tensioner 980. After striking the actuator tensioner 980, the driver 918 moves the actuator tensioner 980 and compresses the spring 922 to move the actuator tensioner 980 towards the pole piece 926 and release the tension in the actuator 914 to open the valve 912. At the end of the desired fuel injection period, the solenoid current in the force generator is stopped or momentarily reversed so that the driver 918 no longer exerts a force against the actuator tensioner 980. As such the biasing member 922 thrusts the actuator tensioner 980 back to the normally closed position which is spaced apart from each of the pole piece 926 and the driver 918. The driver 918 also moves to its normally closed position to be adjacent to the magnet 930 and spaced apart from the actuator tensioner 980.

It will be apparent that various changes and modifications can be made without departing from the scope of the disclosure. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

Features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A fuel injector for delivering fuel to an engine, the fuel injector comprising:
   a body having a fuel conduit for receiving the fuel from a fuel source and a fuel exit passage for delivering the fuel to a combustion chamber of the engine;
   an actuator having a valve and a stop, wherein the stop is configured to move from a first position to a second position to move the valve from a closed position to an open position; and a driver positioned proximate to the actuator and extending from a first end to a second end, wherein the driver is configured to travel longitudinally within the body to impact the stop to move the stop from the first position to the second position, and wherein travel of the driver includes travel of the first end and travel of the second end.

2. The fuel injector of claim 1, further comprising a force generator positioned concentrically around the driver, wherein the driver is further positioned between the stop and the valve, wherein the force generator is configured to move the driver from the first position to the second position, wherein the first position includes the first end of the driver spaced apart from the stop and the second end of the driver in contact with the valve, and wherein the second position includes the first end of the driver in contact with the stop and the second end of the driver spaced apart from the valve.

3. The fuel injector of claim 1 wherein the driver includes an actuator cavity, wherein the actuator is positioned within the actuator cavity, and wherein the driver is further configured to travel longitudinally to move the valve to the closed position.

4. The fuel injector of claim 1, further comprising a spring positioned in the body, wherein the driver includes a first biasing surface, wherein the body further includes a second biasing surface, wherein the travel of the driver to impact the stop is in a first direction, and wherein the spring is positioned to contact the first surface and the second surface to bias the driver in a second direction, opposite to the first direction.

5. The fuel injector of claim 4 wherein biasing of the driver in the second direction urges the second end of the driver against the valve and at least partially maintains the valve in the closed position.

6. The fuel injector of claim 1, further comprising:
a force generator positioned within the body and configured to move the driver to impact the stop; and
a fuel passage at least partially surrounding the force generator and configured to cool the force generator as the fuel flows through the fuel passage.

7. A fuel injector for delivering fuel to an engine, the fuel injector comprising:
a body having a fuel conduit for receiving the fuel from a fuel source and a fuel exit passage for delivering the fuel to a combustion chamber of the engine;
an actuator having a valve and a stop, wherein the stop is configured to move from a first position to a second position to move the valve from a closed position to an open position;
a driver positioned proximate to the actuator and configured to travel longitudinally within the body to impact the stop to move the stop from the first position to the second position; and
a magnet positioned in the body, wherein the travel of the driver to impact the stop is in a first direction, wherein the magnet is configured to bias the driver in a second direction, opposite to the first direction, and wherein biasing of the driver in the second direction at least partially maintains the valve in the closed position.

8. A fuel injector for delivering fuel to an engine, the fuel injector comprising:
a body having a fuel conduit for receiving the fuel from a fuel source and a fuel exit passage for delivering the fuel to a combustion chamber of the engine;
an actuator having a valve and a stop, wherein the stop is configured to move from a first position to a second position to move the valve from a closed position to an open position;
a driver positioned proximate to the actuator and configured to travel longitudinally within the body to impact the stop to move the stop from the first position to the second position; and
an electromagnetic force generator configured to generate a magnetic field to move the driver, and wherein the driver includes a slit radially extending through at least a portion of the driver, the slit configured to reduce eddy currents induced by the force generator.

9. A fuel injector for delivering fuel to a combustion chamber of an engine, the fuel injector comprising:
a body having a nozzle portion opposite a base portion, wherein the nozzle portion is configured to extend through a port to the combustion chamber, and wherein the base portion is configured to receive the fuel from a fuel source;
an actuator positioned at least partially within the body, the actuator having a valve at the nozzle portion and a stop at the base portion, wherein the valve is configured to meter the fuel delivered to the combustion chamber; and
a driver extending from a first end to a second end and encircling at least a portion of the actuator, wherein the driver is configured to move from a first position with the first end spaced apart from the stop to a second position with the first end in contact with the stop, and wherein movement of the driver from the first position to the second position includes:
movement of the first end of the driver to impact the stop to move the valve to an open position; and
movement of the second end of the driver away from the valve.

10. The fuel injector of claim 9, further comprising a biasing member configured to bias the driver toward the first position, and wherein the second end at least partially retains the valve in the closed position when the driver is in the first position.

11. The fuel injector of claim 9, further comprising:
a force generator positioned within the body and configured to move the driver from the first position to the second position; and
a fuel passage extending through the body with a portion of the fuel passage proximate to the force generator, wherein the fuel passage is configured to cool the force generator.

12. The fuel injector of claim 9, further comprising a piezoelectric force generator positioned to move the driver.

13. The fuel injector of claim 9, further comprising:
a spring positioned to bias the driver towards the first position; and
a valve seat at the nozzle portion, wherein the driver at least partially retains the valve against the valve seat when the driver is in the first position.

14. The fuel injector of claim 9, further comprising:
a force generator positioned within the body and configured to move the driver from the first position to the second position; and
a biasing member positioned within the body and configured to bias the driver towards the first position.

15. A method for injecting fuel into a combustion chamber, the method comprising:
delivering the fuel to a fuel conduit in an injector;
directing the fuel through a body of the injector;
impacting a stop with a driver to move a valve from a closed position to an open position to inject the fuel into the combustion chamber, wherein impacting the stop includes moving the driver from a first position with a first end of the driver spaced apart from the stop and a second end of the driver in contact with the valve, to a second position with the first end of the driver in contact with the stop and the second end of the driver spaced apart from the valve.

16. The method of claim 15 wherein impacting the stop with a driver includes moving the driver in a first direction, the method further comprising biasing the driver in a second direction, opposite to the first direction, to at least partially retain the valve in the closed position.

17. The method of claim 15, further comprising moving the driver with a force generator that generates a magnetic field.

18. The method of claim 17, wherein directing the fuel through the body of the injector includes directing the fuel through a fuel passage adjacent to the force generator to cool the force generator.

19. The method of claim 15 wherein moving the driver includes applying electrical current to a piezoelectric device to move the driver.

20. The method of claim 15, further comprising biasing the driver towards the first position to move the valve to the closed position.

21. A fuel injector for delivering fuel to an engine, the fuel injector comprising:

a body having a fuel conduit for receiving the fuel from a fuel source and a fuel exit passage for delivering the fuel to a combustion chamber of the engine;

an actuator having a valve and a stop, wherein the stop is configured to move from a first position to a second position to move the valve from a closed position to an open position; and a driver positioned proximate to the actuator and configured to travel longitudinally within the body to impact the stop to move the stop from the first position to the second position, wherein the driver extends along an axis from a first end to a second end, and wherein both the first end and the second end of the driver travel longitudinally within the body.

22. The fuel injector of claim 21, further comprising a force generator positioned concentrically around the driver, wherein the driver is further positioned between the stop and the valve, and wherein the force generator is configured to move the driver from a position in contact with the valve and spaced apart from the stop to a position in contact with the stop and spaced apart from the valve.

* * * * *